United States Patent
Määttänen et al.

(10) Patent No.: US 12,206,501 B2
(45) Date of Patent: Jan. 21, 2025

(54) LCH MAPPING TO HARQ PROCESS ID FOR NON-TERRESTRIAL NETWORKS

(71) Applicant: TELEFONAKTIEBOLAGET LM ERICSSON (PUBL), Stockholm (SE)

(72) Inventors: Helka-Liina Määttänen, Helsinki (FI); Björn Hofström, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 567 days.

(21) Appl. No.: 17/288,986

(22) PCT Filed: Nov. 1, 2019

(86) PCT No.: PCT/IB2019/059405
§ 371 (c)(1),
(2) Date: Apr. 27, 2021

(87) PCT Pub. No.: WO2020/089858
PCT Pub. Date: May 7, 2020

(65) Prior Publication Data
US 2021/0385020 A1 Dec. 9, 2021

Related U.S. Application Data

(60) Provisional application No. 62/754,317, filed on Nov. 1, 2018.

(51) Int. Cl.
*H04L 1/18* (2023.01)
*H04L 1/1812* (2023.01)
*H04L 1/1829* (2023.01)

(52) U.S. Cl.
CPC .......... *H04L 1/1812* (2013.01); *H04L 1/1854* (2013.01); *H04L 1/1861* (2013.01); *H04L 1/1864* (2013.01)

(58) Field of Classification Search
CPC ............................. H04W 72/12; H04L 1/1893
See application file for complete search history.

(56) References Cited

U.S. PATENT DOCUMENTS

2005/0181811 A1   8/2005  Magnusson et al.
2013/0242837 A1   9/2013  Yang et al.
(Continued)

FOREIGN PATENT DOCUMENTS

WO       2020065530 A1     4/2020

OTHER PUBLICATIONS

3rd Generation Partnership Project; Technical Specification Group Radio Access Network; Study on New Radio (NR) to support non-terrestrial networks (Release 15), 3GPP TR 38.811 V15.4.0, Sep. 2020. https://portal.3gpp.org/desktopmodules/Specifications/SpecificationDetails.aspx?specificationId=3234.

(Continued)

*Primary Examiner* — Sulaiman Nooristany
(74) *Attorney, Agent, or Firm* — Withrow & Terranova, PLLC

(57) ABSTRACT

A method performed by a wireless device for mapping data to specific HARQ processes is provided. The method includes receiving an indication that maps data that can be sent on one or more of specific HARQ processes and transmitting/receiving a transmission for the specific HARQ process based on the received indication. A method performed by a base station for mapping data to specific HARQ processes is also provided. A wireless device and a base station for mapping data to specific HARQ processes are also provided.

14 Claims, 14 Drawing Sheets

Embodiment 6

(56) References Cited

U.S. PATENT DOCUMENTS

| | | | |
|---|---|---|---|
| 2015/0180619 A1* | 6/2015 | Majjigi | H04W 72/23 370/330 |
| 2016/0261391 A1 | 9/2016 | Chen et al. | |
| 2017/0070940 A1 | 3/2017 | Handa et al. | |
| 2018/0006791 A1 | 1/2018 | Marinier et al. | |
| 2018/0317213 A1 | 11/2018 | Islam et al. | |
| 2019/0246420 A1* | 8/2019 | Park | H04W 72/23 |
| 2019/0363843 A1 | 11/2019 | Gordaychik | |
| 2020/0274657 A1 | 8/2020 | Deenoo et al. | |
| 2021/0014832 A1 | 1/2021 | Liu et al. | |
| 2021/0075691 A1 | 3/2021 | Zeng et al. | |
| 2021/0314092 A1 | 10/2021 | Wen et al. | |
| 2022/0045803 A1 | 2/2022 | Lin et al. | |
| 2022/0311550 A1 | 9/2022 | Nam et al. | |

OTHER PUBLICATIONS

Huawei, et al.,"Packet duplication over MAC" 3GPP TSG-RAN2 Meeting #103, R2-1812077, Gothenburg, Sweden, Aug. 20-24, 2018.

Interdigital Communications, "MAC Architecture for NR", 3GPP TSG-RAN WG2 #97bis, R2-1702868, Spokane, USA, Apr. 3-7, 2017.

Nokia Siemens Networks, et al., "2msec TTI coverage extension" 3GPP TSG-RAN WG2 Meeting #66, R2-09307, San Francisco, USA, Apr. 4-8, 2009.

Oppo, "Discussion on intra-UE prioritization/multiplexing", 3GPP TSG RAN WG2 Meeting #103bis, R2-1813844, Chengdu, China, Oct. 8-12, 2018.

Thales, "Study on solutions evaluation for NR to support Non Terrestrial Network", 3GPP TSG RAN meeting #80, RP-181370, La Jolla, USA, Jun. 11-14, 2018.

International Search Report and Written Opinion issued on applicant's corresponding PCT application PCT/IB2019/059405 pp. 1-10.

Author Unknown, "Technical Specification Group Radio Access Network; Study on New Radio (NR) to support non terrestrial networks (Release 15)," Technical Report 38.811, Version 1.0.0, 3GPP Organizational Partners, Jun. 2018, 136 pages.

Author Unknown, "Technical Specification Group Radio Access Network; Study on New Radio (NR) to support non terrestrial networks (Release 15)," Technical Report 38.811, Version 15.0.0, 3GPP Organizational Partners, Jun. 2018, 118 pages.

Author Unknown, "Technical Specification Group Radio Access Network; Solutions for NR to support non-terrestrial networks (NTN) (Release 16)," Technical Report 38.821, Version 0.1.0, 3GPP Organizational Partners, Sep. 2018, 18 pages.

Author Unknown, "Technical Specification Group Radio Access Network; Evolved Universal Terrestrial Radio Access (E-UTRA); Medium Access Control (MAC) protocol specification (Release 15)," Technical Specification 36.321, Version 15.2.0, 3GPP Organizational Partners, Jul. 2018, 126 pages.

Author Unknown, "Technical Specification Group Radio Access Network; NR; Physical layer procedures for data (Release 15)," Technical Specification 38.214, Version 15.2.0, 3GPP Organizational Partners, Jun. 2018, 95 pages.

Huawei, et al., "R1-1908050: Discussion on HARQ for NTN," Third Generation Partnership Project (3GPP), TSG RAN WG1 Meeting #98, Aug. 26-30, 2019, 5 pages, Prague, Czech Republic.

Interdigital ING., "R1-1804857: Deactivating HARQ for Non-Terrestrial Networks," Third Generation Partnership Project (3GPP), TSG RAN WG1 Meeting #92bis, Apr. 16-20, 2018, 3 pages, Sanya, China.

Nomor Research GMBH, et al., "R2-1813615: Considerations on MAC Control Loops and Timings in Non-Terrestrial Networks (NTN)," Third Generation Partnership Project (3GPP), TSG-RAN WG2 Meeting # 103-Bis, Oct. 8-12, 2018, 6 pages, Chengdu, China.

Thales, et al., "RP-171450: Study on NR to support Non-Terrestrial Networks," Third Generation Partnership Project (3GPP), TSG RAN WG1 Meeting 88bis, Jun. 5-9, 2017, 5 pages, West Palm Beach, USA.

Thales, et al., "RP-181394: NR-NTN: TP for Chap 7.3 NR modifications to support NTN," Third Generation Partnership Project (3GPP), TSG RAN Meeting #80, Jun. 11-14, 2018, 34 pages, La Jolla, USA.

Examination Report for European Patent Application No. 19780417.2, mailed Jan. 26, 2023, 7 pages.

Invitation to Pay Additional Fees and Partial Search for International Patent Application No. PCT/IB2019/058094, mailed Dec. 13, 2019, 17 pages.

International Search Report and Written Opinion for International Patent Application No. PCT/IB2019/058094, mailed Feb. 5, 2020, 22 pages.

Non-Final Office Action for U.S. Appl. No. 17/280,622, mailed Oct. 24, 2023, 36 pages.

Examination Report for European Patent Application No. 19839128.6, mailed Feb. 13, 2023, 5 pages.

Intention to Grant for European Patent Application No. 19839128.6, mailed Mar. 14, 2024, 8 pages.

Final Office Action for U.S. Appl. No. 17/280,622, mailed May 6, 2024, 31 pages.

Non-Final Office Action for U.S. Appl. No. 17/280,622, mailed Sep. 9, 2024, 20 pages.

* cited by examiner

*HARQ protocol at the MAC layer*

Embodiment 1

Embodiment 2

Embodiment 3

*Embodiment 6*

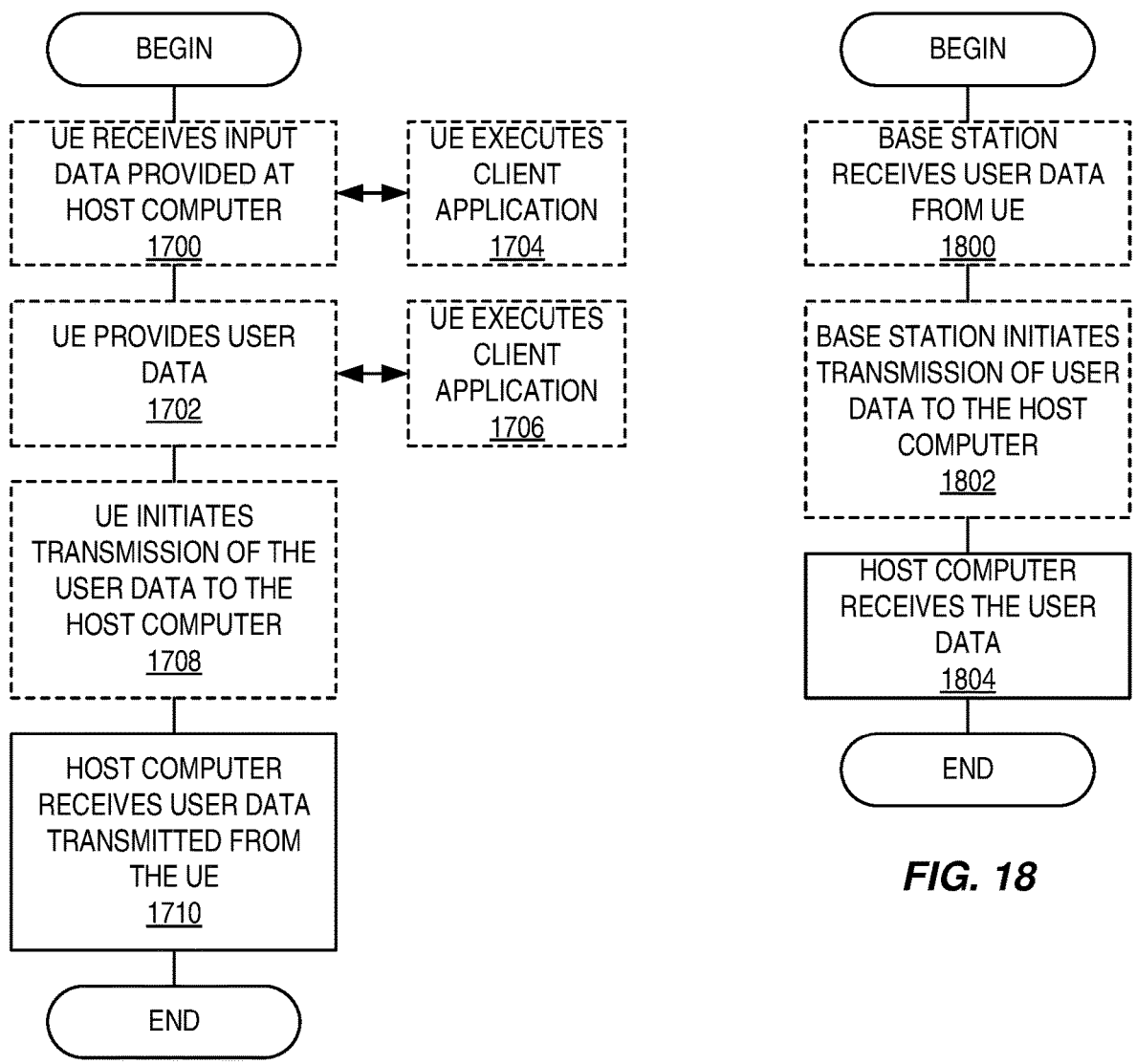

LCH MAPPING TO HARQ PROCESS ID FOR NON-TERRESTRIAL NETWORKS

RELATED APPLICATIONS

This application claims the benefit of provisional patent application Ser. No. 62/754,317, filed Nov. 1, 2018, the disclosure of which is hereby incorporated herein by reference in its entirety.

TECHNICAL FIELD

The present disclosure relates to communications networks and, more specifically, to Hybrid Acknowledgement Repeat Request (HARQ) for communication networks.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

There is an ongoing resurgence of satellite communications. Several plans for satellite networks have been announced in the past few years. The target services vary, from backhaul and fixed wireless, to transportation, to outdoor mobile, to Internet of Things (IoT). Satellite networks could complement mobile networks on the ground by providing connectivity to underserved areas and multicast/broadcast services.

To benefit from the strong mobile ecosystem and economy of scale, adapting the terrestrial wireless access technologies including Long Term Evolution (LTE) and New Radio (NR) for satellite networks is drawing significant interest. For example, Third Generation Partnership Project (3GPP) completed an initial study in Release 15 on adapting NR to support non-terrestrial networks (mainly satellite networks) (see TR 38.811 V15.0.0, Study on New Radio (NR) to support non-terrestrial networks, incorporated by reference). This initial study focused on the channel model for the non-terrestrial networks, defining deployment scenarios, and identifying the key potential impacts. 3GPP is conducting a follow-up study item in Release 16 on solutions evaluation for NR to support non-terrestrial networks (see RP-181370, Study on solutions evaluation for NR to support non-terrestrial Network, incorporated by reference).

Satellite Communications

A satellite radio access network usually includes the following components:
- Gateway that connects satellite network to core network
- Satellite that refers to a space-borne platform
- Terminal that refers to user equipment
- Feeder link that refers to the link between a gateway and a satellite
- Service link that refers to the link between a satellite and a terminal The link from gateway to terminal is often called forward link, and the link from terminal to gateway is often called return link. Depending on the functionality of the satellite in the system, we can consider two transponder options
- Bent pipe transponder: satellite forwards the received signal back to the earth with only amplification and a shift from uplink frequency to downlink frequency.
- Regenerative transponder: satellite includes on-board processing to demodulate and decode the received signal and regenerate the signal before sending it back to the earth.

Depending on the orbit altitude, a satellite may be categorized as Low Earth Orbiting (LEO), Medium Earth Orbiting (MEO), or Geostationary (GEO) satellite.
- LEO: typical heights ranging from 500-1,500 km, with orbital periods ranging from 10-40 minutes.
- MEO: typical heights ranging from 5,000-12,000 km, with orbital periods ranging from 2-8 hours.
- GEO: typical height is about 35,786 km, with an orbital period of 24 hours.

A communication satellite typically generates several beams over a given area. The footprint of a beam is usually in an elliptic shape, which has been traditionally considered as a cell. The footprint of a beam is also often referred to as a spotbeam. The footprint of a beam may move over the earth surface with the satellite movement or may be earth fixed with some beam pointing mechanism used by the satellite to compensate for its motion. The size of a spotbeam depends on the system design, which may range from tens of kilometers to a few thousands of kilometers.

FIG. 1 shows an example architecture of a satellite network with bent pipe transponders.

The two main physical phenomena that affect satellite communications system design are the long propagation delay and Doppler effects. The Doppler effects are especially pronounced for LEO satellites.

Propagation Delays

Propagation delay is a main physical phenomenon in a satellite communication system that makes the design different from that of a terrestrial mobile system. For a bent pipe satellite network, the following delays are relevant.
- One-way delay: from the base station (BS) to the User Equipment (UE) via the satellite, or the other way around
- Round-trip delay: from the BS to the UE via the satellite and from the UE back to the BS via the satellite
- Differential delay: the delay difference of two selected points in the same spotbeam Note that there may be additional delay between the ground BS antenna and BS, which may or may not be collocated. This delay depends on deployment. If the delay cannot be ignored, it should be taken into account in the communications system design.

The propagation delay depends on the length of the signal path, which further depends on the elevation angles of the satellite seen by the BS and UE on the ground. The minimum elevation angle is typically more than 10° for UE and more than 5° for BS on the ground. These values will be assumed in the delay analysis below.

The following Tables 1 and 2 are taken from 3GPP TR 38.811 V15.0.0, Study on New Radio (NR) to support non-terrestrial networks, incorporated by reference. We can see that the round-trip delay is much larger in satellite systems. For example, it is about 545 ms for a GEO satellite system. In contrast, the round-trip time is normally no more than 1 ms for typical terrestrial cellular networks.

TABLE 1

Propagation delays for GEO satellite at 35,786 km (extracted from Table 5.3.2.1-1 in 3GPP TR 38.811 V15.0.0, Study on New Radio (NR) to support non-terrestrial networks, incorporated by reference

| | | GEO at 35786 km | |
|---|---|---|---|
| Elevation angle | Path | D (km) | Time (ms) |
| UE: 10° | satellite - UE | 40586 | 135.286 |
| GW: 5° | satellite - gateway | 41126.6 | 137.088 |
| 90° | satellite - UE | 35786 | 119.286 |
| | Bent Pipe satellite | | |
| One way delay | Gateway-satellite_UE | 81712.6 | 272.375 |
| Round trip Time | Twice | 163425.3 | 544.751 |
| | Regenerative Satellite | | |
| One way delay | Satellite -UE | 40586 | 135.286 |
| Round Trip Time | Satellite-UE-Satellite | 81172 | 270.572 |

TABLE 2

Propagation delays for NGSO satellites (extracted from Table 5.3.4.1-1 in 3GPP TR 38.811 V15.0.0, Study on New Radio (NR) to support non-terrestrial networks, incorporated by reference

| | | LEO at 600 km | | LEO at 1500 km | | MEO at 10000 km | |
|---|---|---|---|---|---|---|---|
| Elevation angle | Path | Distance D (km) | Delay (ms) | Distance D (km) | Delay (ms) | Distance D (km) | Delay (ms) |
| UE: 10° | satellite - UE | 1932.24 | 6.440 | 3647.5 | 12.158 | 14018.16 | 46.727 |
| GW: 5° | satellite - gateway | 2329.01 | 7.763 | 4101.6 | 13.672 | 14539.4 | 48.464 |
| 90° | satellite - UE | 600 | 2 | 1500 | 5 | 10000 | 33.333 |
| | Bent pipe satellite | | | | | | |
| One way delay | Gateway-satellite UE | 4261.2 | 14.204 | 7749.2 | 25.83 | 28557.6 | 95.192 |
| Round Trip Delay | Twice | 8522.5 | 28.408 | 15498.4 | 51.661 | 57115.2 | 190.38 |
| | Regenerative satellite | | | | | | |
| One way delay | Satellite -UE | 1932.24 | 6.44 | 3647.5 | 12.16 | 14018.16 | 46.73 |
| Round Trip Delay | Satellite-UE-Satellite | 3864.48 | 12.88 | 7295 | 24.32 | 28036.32 | 93.45 |

Generally, within spot beam covering one cell, the delay can be divided into a common delay component and a differential delay component. The common delay is the same for all UEs in the cell and is determined with respect to a reference point in the spot beam. In contrast, the differential delay is different for different UEs which depends on the propagation delay between the reference point and the point at which a given UE is positioned within the spot beam.

The differential delay is mainly due to the different path lengths of the service links, since the feeder link is normally the same for terminals in the same spotbeam. Further, the differential delay is mainly determined by the size of the spotbeam. It may range from sub-millisecond (for spotbeam on the order of tens of kilometres) to tens of millisecond (for spotbeam on the order of thousands of kilometres).

New Study Item (SI) "Solutions for NR to Support Non-Terrestrial Network"

In RAN#80, a new SI "Solutions for NR to support Non Terrestrial Network" was agreed (see RP-181370, Study on solutions evaluation for NR to support non-terrestrial Network, incorporated by reference). It is a continuation of a preceding SI "NR to support Non-Terrestrial Networks" (RP-171450), where the objective was to study the channel model for the non-terrestrial networks, to define deployment scenarios, parameters and identify the key potential impacts on NR. The results are reflected in TR 38.811, V15.0.0.

The objectives of the current SI are to evaluate solutions for the identified key impacts from the preceding SI and to study impact on Radio Access Network (RAN) protocols/architecture. The objectives for layer 2 and above are:

Study the following aspects and identify related solutions if needed: Propagation delay: Identify timing requirements and solutions on layer 2 aspects, MAC, RLC, RRC, to support non-terrestrial network propagation delays considering FDD and TDD duplexing mode. This includes radio link management. [RAN2]

Handover: Study and identify mobility requirements and necessary measurements that may be needed for handovers between some non-terrestrial space-borne vehicles (such as Non Geo stationary satellites) that move at much higher speed but over predictable paths [RAN2, RAN1]

Architecture: Identify needs for the 5G's Radio Access Network architecture to support non-terrestrial networks (e.g. handling of network identities) [RAN3]

Paging: procedure adaptations in case of moving satellite foot prints or cells

Note: This new study item does not address regulatory issues:

The coverage pattern of Non-Terrestrial Network (NTN) is described in TR 38.811 V15.0.0 in Section 4.6 as follows:

Satellite or aerial vehicles typically generate several beams over a given area. The foot print of the beams are typically elliptic shape.

The beam footprint may be moving over the earth with the satellite or the aerial vehicle motion on its orbit. Alternatively, the beam foot print may be earth fixed, in such case some beam pointing mechanisms (mechanical or electronic steering feature) will compensate for the satellite or the aerial vehicle motion.

TABLE 4.6-1

| Typical beam foot print size | | | |
|---|---|---|---|
| Attributes | GEO | Non-GEO | Aerial |
| Beam foot print size in diameter | 200-1000 km | 100-500 km | 5-200 km |

Typical beam patterns of various NTN access networks are depicted in FIG. 2.

The TR of the ongoing SI, TR 38.821 V0.1.0, describes scenarios for the NTN work as follows:

Non-Terrestrial Network typically features the following elements:

One or several sat-gateways that connect the Non-Terrestrial Network to a public data network
- a GEO satellite is fed by one or several sat-gateways which are deployed across the satellite targeted coverage (e.g. regional or even continental coverage). We assume that UE in a cell are served by only one sat-gateway A Non-GEO satellite served successively by one sat-gateway at a time.

The system ensures service and feeder link continuity between the successive serving sat-gateways with sufficient time duration to proceed with mobility anchoring and handover Four scenarios are considered as depicted in Table 4.2-1 and are detailed in Table 4.2-2.

TABLE 4.2-1

| Reference scenarios | | |
|---|---|---|
| | Transparent satellite | Regenerative satellite |
| GEO based non-terrestrial access network | Scenario A | Scenario B |
| LEO based non-terrestrial access network | Scenario C | Scenario D |

TABLE 4.2-2

| Reference scenario parameters | | |
|---|---|---|
| Scenarios | GEO based non-terrestrial access network (Scenario A and B) | LEO based non-terrestrial access network (Scenario C & D) |
| Orbit type | notional station keeping position fixed in terms of elevation/azimuth with respect to a given earth point | circular orbiting around the earth |
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Max channel bandwidth (service link) | 30 MHz for band <6 GHz<br>400 MHz for band >6 GHz | |
| Payload | Scenario A: Transparent (including radio frequency function only)<br>Scenario B: regenerative (including all or part of RAN functions) | Scenario C: Transparent (including radio frequency function only)<br>Scenario D: Regenerative (including all or part of RAN functions) |
| Inter-Satellite link | No | Scenario C: No<br>Scenario D: Yes |
| Earth-fixed beams | Yes | Scenario C:<br>No (the beams move with the satellite)<br>Scenario D, option 1:<br>Yes (steering beams), see note 1<br>Scenario D, option 2:<br>No (the beams move with the satellite) |
| Max beam foot print diameter at nadir | 500 km | 200 km |
| Min Elevation angle for both sat-gateway and user equipment | 10° | 10° |
| Max distance between satellite and user equipment at min elevation angle | 40,586 km | 1,932 km (600 km altitude)<br>3,131 km (1,200 km altitude) |
| Max Round Trip Delay (propagation delay only) | Scenario A: 562 ms (service and feeder links)<br>Scenario B: 281 ms | Scenario C: 25.76 ms (transparent payload: service and feeder links)<br>Scenario D: 12.88 ms (regenerative payload: service link only) |

TABLE 4.2-2-continued

| | Reference scenario parameters | |
|---|---|---|
| Scenarios | GEO based non-terrestrial access network (Scenario A and B) | LEO based non-terrestrial access network (Scenario C & D) |
| Max delay variation within a beam (earth fixed user equipment) | 16 ms | 4.44 ms (600 km) 6.44 ms (1200 km) |
| Max differential delay within a beam | 1.6 ms | 0.65 ms (*) |
| Max Doppler shift (earth fixed user equipment) | 0.93 ppm | 24 ppm (*) |
| Max Doppler shift variation (earth fixed user equipment) | 0.000 045 ppm/s | 0.27 ppm/s (*) |
| User equipment motion on the earth | 1000 km/h (e.g. aircraft) | 500 km/h (e.g. high speed train) Possibly 1000 km/h (e.g. aircraft) |
| User equipment antenna types | Omnidirectional antenna (linear polarisation), assuming 0 dBi Directive antenna (up to 60 cm equivalent aperture diameter in circular polarisation) | |
| User equipment Tx power | Omnidirectional antenna: UE power class 3 with up to 200 mW Directive antenna: up to 4 W | |
| User equipment Noise figure | Omnidirectional antenna: 7 dB Directive antenna: 1.2 dB | |
| Service link | 3GPP defined New Radio | |
| Feeder link | 3GPP or non-3GPP defined Radio interface | 3GPP or non-3GPP defined Radio interface |

NOTE 1:
Each satellite has the capability to steer beams towards fixed points on earth using beamforming techniques. This is applicable for a period of time corresponding to the visibility time of the satellite
NOTE 2:
Max delay variation within a beam (earth fixed user equipment) is calculated based on Min Elevation angle for both gateway and user equipment
NOTE 3:
Max differential delay within a beam is calculated based on Max beam foot print diameter at nadir
The numbers in the table above marked with (*) corresponds to an altitude of 600 km.

For scenario D, which is LEO with regenerative payload, both earth-fixed and earth moving beams have been listed. So, when we factor in the fixed/non-fixed beams, we have an additional scenario. The complete list of 5 scenarios in 38.821 is then:
 Scenario A—GEO, transparent satellite, Earth-fixed beams;
 Scenario B—GEO, regenerative satellite, Earth fixed beams;
 Scenario C—LEO, transparent satellite, Earth-moving beams;
 Scenario D1—LEO, regenerative satellite, Earth-fixed beams;
 Scenario D2—LEO, regenerative satellite, Earth-moving beams.
There currently exist certain challenge(s).

Existing HARQ procedures at the PHY/MAC layer have been designed for terrestrial networks where the round-trip propagation delay is restricted to be within the cyclic prefix (CP) duration. Thus, existing HARQ procedures in LTE/NR are not well suited for satellite-based networks.

Summary

In this disclosure, systems and methods for mapping data on specific HARQ process ID to account for large propagation delays and still offer reliable communication are disclosed.

Embodiments described herein provide mapping of data to specific HARQ process IDs.

Certain embodiments of the present disclosure introduce systems, methods and apparatuses to map specific data to specific HARQ processes to allow some data to be sent with the HARQ procedure enabled and for other data, disabled.

In one embodiment, a method The method includes at least one of receiving an indication that maps data that can be sent on one or more of specific HARQ processes, and transmitting/receiving (WT406) a transmission for the specific HARQ process based on the received indication. In some embodiments, the indication comprises a parameter for logical channel prioritization, LCP. In some embodiments, the indication is a grant or within a grant. In some embodiments, the method further includes including only data from specific logical channels, LCH, that are allowed to send data on HARQ processes with HARQ feedback disabled, based on the received indication. In some embodiments, based on the received indication and/or absence of a received indication, the wireless device interprets that any logical channel, LCH, is valid for a grant. In some embodiments, the method further includes receiving (WT104), from the base station, an indication of a number of repetitions to use for bundling for the specific HARQ process.

In one embodiment, a method performed by a base station for mapping data to specific HARQ processes is provided. The method includes at least one of: determining (e.g., deciding) an indication for mapping data and sending to a user equipment an indication that maps data that can be sent on one or more of specific HARQ processes. In some embodiments, the indication comprises a parameter for logical channel prioritization, LCP. In some embodiments, the indication is a grant or within a grant. In some embodiments, the method further includes including only data from specific logical channels, LCH, that are allowed to send data on HARQ processes with HARQ feedback disabled, based on the received indication. In some embodiments, based on the received indication and/or absence of a received indication, the wireless device interprets that any logical channel, LCH, is valid for a grant. In some embodiments, the method further includes receiving, from the base station, an indication of a number of repetitions to use for bundling for the specific HARQ process.

In some embodiments, wireless devices and base stations for deactivating HARQ mechanisms, including processing circuitry configured to perform any of the steps of any of the methods according to the embodiments, are provided.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 15 through 18 are flowcharts illustrating methods implemented in a communication system, in accordance with various embodiments.

DETAILED DESCRIPTION

Figure 1:
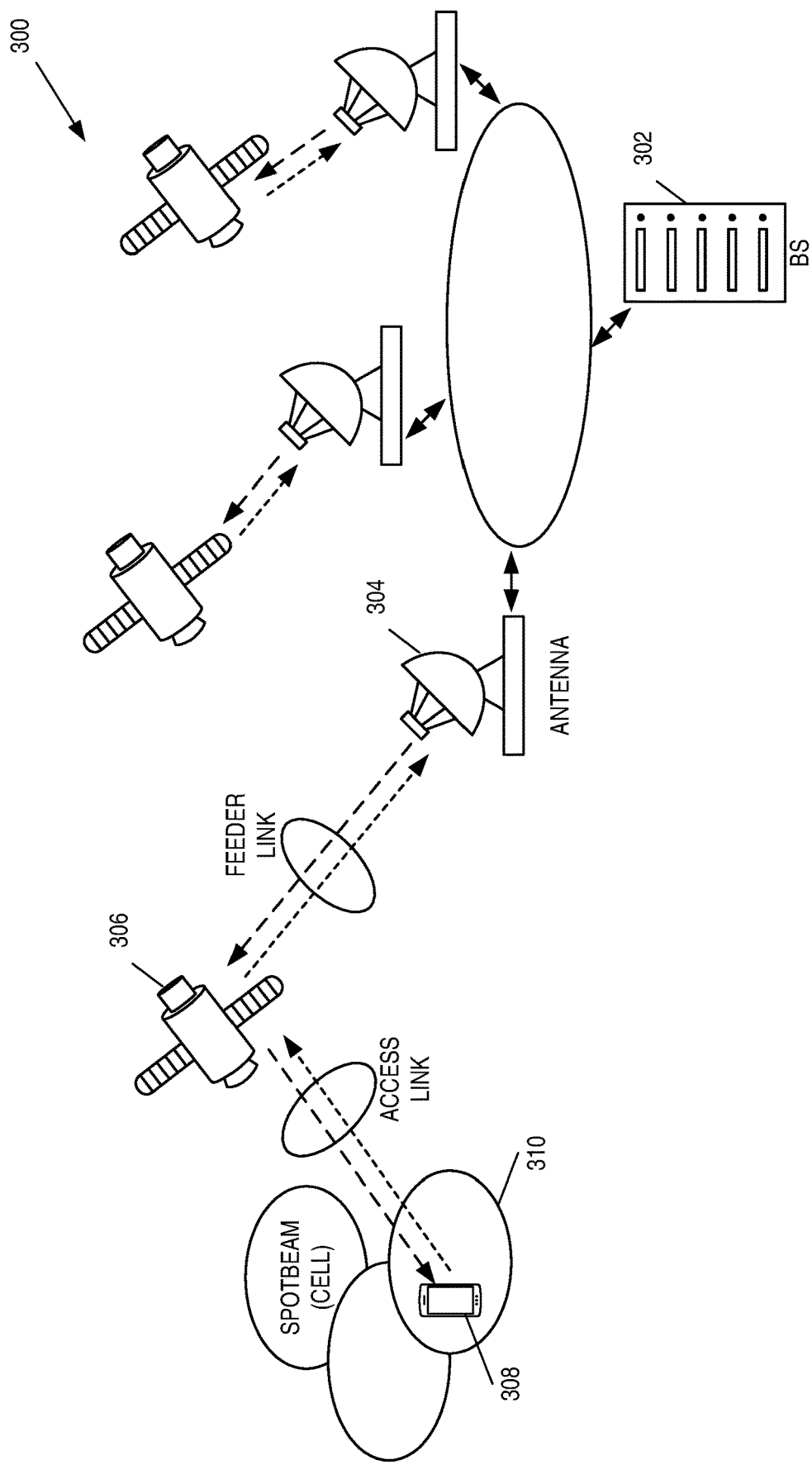
FIG. 1 shows an example architecture of a satellite network with bent pipe transponders.
Figure 2:
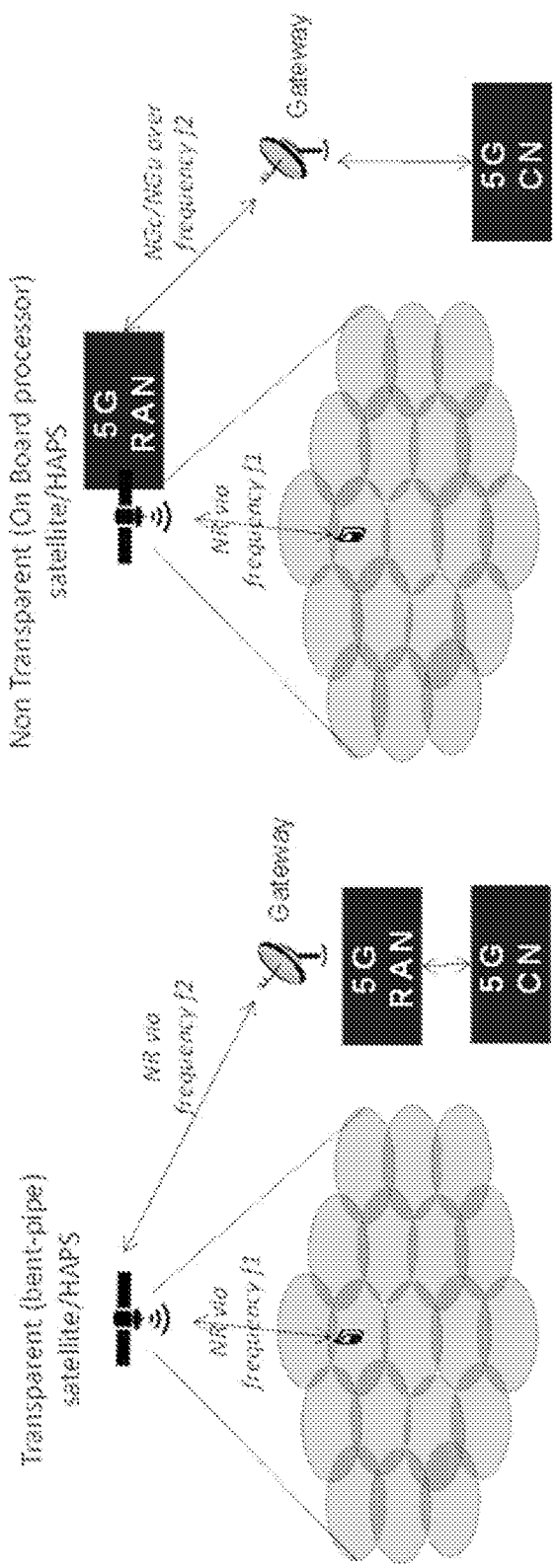
FIG. 2 illustrates typical beam patterns of various NTN access networks.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art. Additional information may also be found in the document(s) provided in the Appendix.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to 5G NR concepts, beams may be used instead of cells and, as such, it is important to note that the concepts described herein are equally applicable to both cells and beams.

In the following discussion, Hybrid Automatic Repeat Request (HARQ) protocol refers to the HARQ procedure at the Physical (PHY)/Medium Access Control (MAC) layer.

Existing HARQ procedures at the PHY/MAC layer have been designed for terrestrial networks where the round-trip propagation delay is restricted to be within the cyclic prefix (CP) duration. With HARQ protocol, a transmitter needs to wait for the feedback from the receiver before sending new data. In case of a negative acknowledgement (NACK), the transmitter may need to resend the data packet. Otherwise, it may send new data. This stop-and-wait (SAW) procedure introduces inherent latency to the communication protocol, which may reduce the link throughput. To alleviate this issue, existing HARQ procedure allows activating multiple HARQ processes at the transmitter. That is, the transmitter may initiate multiple transmissions in parallel without having to wait for a HARQ completion. For example, with 16 (8) HARQ processes in NR (LTE) DL, the gNB (eNB) may initiate up to 16 (8) new data transmissions without waiting for an ACK for the first packet transmission. Note that there are sufficient number of HARQ processes for terrestrial networks where the propagation delay is typically less than 1 ms.

Figure 3:
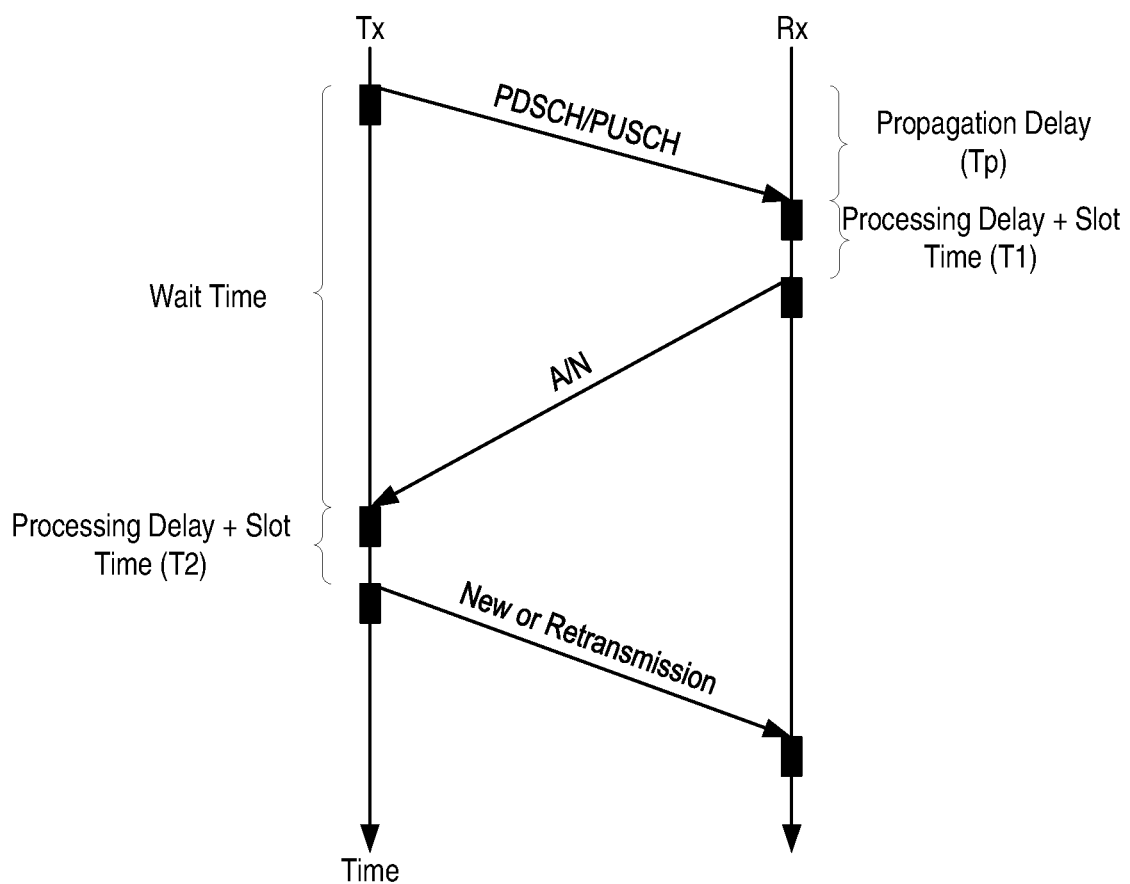
FIG. 3 illustrates various delays associated with the Hybrid Automatic Repeat Request (HARQ) procedure of Third Generation Partnership Project (3GPP) Long Term Evolution (LTE) and New Radio (NR)

FIG. 3 shows the various delays associated with the HARQ procedure:

The packet first reaches the receiver after a propagation delay Tp.

The receiver sends the feedback after a processing/slot delay T1.

The feedback reaches the data transmitter after a propagation delay Tp.

The transmitter may send a retransmission or new data after a processing/slot delay T2.

The required number of HARQ processes is (2Tp+T1+T2)/Ts where Ts is the slot duration.

Some issues with existing HARQ protocol amid large propagation delays are identified below:

The existing HARQ mechanism may not be feasible when the propagation delay is much larger than that supported by the allowed number of HARQ processes. For example, consider the scenario where LTE DL is to be adopted for satellite communications. For the GEO case, the RTT propagation delay can be around 500 ms. With 8 HARQ processes, the eNB needs to wait for around 500 ms before sending new data. This translates to benefitting from only a meager fraction (8/500) of the available peak throughput. Therefore, without a sufficient number of HARQ processes, the sheer magnitude of the propagation delay may render closed-loop HARQ communication impractical.

The number of HARQ processes supported by the existing HARQ protocol are not sufficient to absorb the potentially large propagation delays in non-terrestrial networks. For example, Table 3 shows that a substantial increase in the existing number of HARQ processes (Note: Rel-15 NR supports a maximum of 16 HARQ processes in UL/DL per serving cell. LTE supports 8 for UL/DL per serving cell) is required for operating HARQ amid large propagation delays. Unfortunately, it is challenging to support that many HARQ processes specially at UE side, due to e.g. the following reasons.

It requires large memory at both the transmitter and receiver.

It may require reducing the HARQ buffer size (and thus the maximum supported TBS).

A large number of HARQ buffers implies a large number of HARQ receivers.

It may increase the signaling overhead for HARQ ID.

TABLE 3

Required number of HARQ processes in satellite networks

| Satellite | Total delay | Reqd. # HARQ processes | Available peak throughput |
|---|---|---|---|
| LEO | ~50 ms | ~50 | 32% |
| MEO | ~180 ms | ~180 | 8.9% |
| GEO | ~600 ms | ~600 | 2.7% |

In short, the existing (PHY/MAC) HARQ mechanism is ill-suited to non-terrestrial networks with large propagation delays. Moreover, there is no existing signaling mechanism for disabling HARQ at the PHY/MAC layers. Therefore, there is a need to develop new signaling procedures for adapting HARQ to non-terrestrial networks.

For example, in non-terrestrial networks where the propagation delay is large, activating the HARQ feedback loop may considerably reduce the throughput due to the inherent stop-and-wait property of the HARQ protocol. With the ability to deactivate HARQ, the eNB/gNB/UE need not wait for the HARQ feedback or retransmissions before transmitting new data. Moreover, it helps saves the time/frequency/energy/computational resources required for HARQ feedback transmission.

In certain scenarios such as in poor channel conditions, it may also be desirable to operate with HARQ enabled so as to avoid aggressive retransmissions and increased latency at the higher layers.

The above enabling/disabling of feedback for certain HARQ processes has earlier been proposed to allow the network to configure the UE to disable parts of the HARQ procedure to mitigate some of the negative impact inflicted by the propagation delay of a non-terrestrial network.

If the HARQ procedure is turned off or altered, there is a risk that the reliability is reduced due to the non-exiting feedback. The reliability could then be increased by using more robust modulation and coding schemes but only to a certain extent. If transport blocks with errors are passed up to higher layers, e.g. RLC, PDCP, TCP, retransmission may occur which will again increase the delay mitigating some of the effect of disabling the HARQ procedure.

To increase the reliability, i.e. reduce the block error rate, BLER, for a non-terrestrial network with HARQ feedback disabled for some specific HARQ process IDs, it has also been proposed to allow bundling of TBs on a per HARQ process ID level. This would allow TBs sent on a specific HARQ process ID to be retransmitted a configurable number of times to reach the BLER targeted for the communication.

In current NR and LTE specifications, the network is in control of what LCHs that shall be served in DL for a given TB. I.e. it is up the network implementation to concatenate data so that bitrates for the different LCH are fulfilled. A TB will then be sent using the next in order and available HARQ process ID. In the uplink, there is Logical Channel Prioritization procedure, configured by RRC, that controls the amount of data that will be sent from each of the available LCH until the size of the TB meet the allocated size indicated in the grant. The TB will then be sent using the next in order and available HARQ process ID.

Given a non-terrestrial network with the new above proposed solutions for disabling and enabling HARQ feedback on a per HARQ processes level as well as to allow bundling on a per HARQ process level implemented, there is currently no means to map certain data/signaling to a certain HARQ process ID, i.e. without a well-defined mapping of what data that is sent on what HARQ process ID, the use of HARQ feedback disabling or HARQ process ID bundling will be of little use.

In this disclosure, systems and methods for mapping data on specific HARQ process ID to account for large propagation delays and still offer reliable communication are provided.

Embodiments described herein provide mapping of data to specific HARQ process IDs.

Certain embodiments may provide none, one or more of the following technical advantage(s). Embodiments of the proposed solution introduce methods for to map specific data to specific HARQ processes to allow some data to be sent with the HARQ procedure enabled and for other data, disabled.

Referring back to FIG. 1, one example of a satellite-based radio access network 300 in which embodiments of the present disclosure may be implemented is illustrated. In some embodiments, the satellite-based radio access network 300 is a radio access network for a cellular communications network such as, e.g., a LTE or NR network.

As illustrated, the satellite-based radio access network 300 includes, in this example, a base station 302 that connects the satellite-based radio access network 300 to core network (not shown). In this example, the base station 302 is connected to a ground-based base station antenna 304 that is, in this example, remote from (i.e., not collocated with) the base station 302. The satellite-based radio access network 300 also includes a satellite 306, which is a space-borne platform, that provides a satellite-based access link to a User Equipment (UE) 308 located in a respective spot-beam, or cell, 310.

The term "feeder link" refers to the link between the base station 302 (i.e., the base station antenna 304 in this example in which the base station 302 and the base station antenna 304 are not collocated) and the satellite 306. The term "service link" refers to the link between the satellite 306 and the UE 308. The link from the base station 302 to the UE 308 is often called the "forward link", and the link from UE 308 to base station 302 is often called the "return link" or "access link." Depending on the functionality of the satellite 306 in the satellite-based radio access network 300, two transponder options can be considered:

Bent pipe transponder: satellite forwards the received signal back to the earth with only amplification and a shift from uplink frequency to downlink frequency.

Regenerative transponder: satellite includes on-board processing to demodulate and decode the received signal and regenerate the signal before sending it back to the earth.

Since there might be data and/or control signaling sent between the UE and the non-terrestrial network that requires higher reliability, it has been previously proposed to allow the network to disable HARQ feedback for certain HARQ processes only (see U.S. Provisional Patent Application Ser. No. 62/737,630 filed Sep. 27, 2018, incorporated by reference).

With the above solution of disabling HARQ feedback for certain HARQ processes, there is a need to use different aggregation factors for different HARQ processes. For example, it may be desirable for a HARQ process with HARQ feedback disabled to be configured with a higher aggregation factor than a HARQ process with HARQ feedback enabled. Note that an aggregation factor is a number that represents the number of times that the transport block will be retransmitted within a bundle. Without the capability of controlling aggregation factors for different HARQ processes, a single aggregation factor has to be used for all the HARQ processes regardless whether the HARQ feedback is enabled/disabled for a particular HARQ process. If the aggregation factor is small or not configured (i.e., aggregation factor=1), a much larger proportion of Transport Block transmission errors (associated with HARQ process(es) without HARQ feedback) than what is designed in the specification needs to be recovered by higher layer retransmission techniques, such as RLC AM mode, PDCP, RRC or TCP. This results in a much higher latency and a reduced throughput. To avoid this, a large value needs to be configured for the aggregation factor, but this in turn makes the transmissions on the HARQ processes with HARQ feedback enabled spectrally inefficient and experience higher latency.

Several embodiments are described below. Embodiments 6 in particular, is aiming at addressing some of the challenges identified above, with respect to mapping data to HARQ processes. While described separately, these embodiments may be used in any desired combination.

Embodiment 1

In one embodiment, bundling of transport blocks (TBs) is enabled for a specific HARQ process (e.g., a HARQ process identified by a specific HARQ process ID). This is sometimes referred to herein as "HARQ process specific bundling". Bundling is available in NR for both uplink and downlink and for both dynamic and configured scheduling. In the existing NR specification, however, bundling can only be activated for all transmissions on all configured HARQ processes. That is, bundling cannot be activated for a specified subset of HARQ processes. Given the proposed ability to disable the HARQ feedback for one or more specific HARQ processes (see U.S. Provisional Patent Application Ser. No. 62/737,630 filed Sep. 27, 2018, incorporated by reference), the reliability would decrease for all TBs sent using these HARQ processes if the aggregation factor is small or not configured. Since not all HARQ processes will have their feedback disabled, it will be useful to increase the reliability by allowing bundling for one or more specific HARQ process IDs (e.g., using HARQ process specific aggregation factor).

Example: HARQ Process ID=2 has its HARQ feedback disabled but is at the same time configured for bundling. When this HARQ process is used for transmission of a TB, it is bundled and the receiver knows how to receive and process these TBs within the bundle. Note that the reception and processing of TBs within the bundle can be performed in any suitable manner such as, e.g., the conventional manner. In case the transmitter desires not using bundling, it may use a HARQ process ID not configured for bundling.

HARQ process specific bundling could be used for HARQ process having a specific HARQ process ID regardless of whether HARQ feedback is disabled or not for that HARQ process.

Which HARQ process to bundle in uplink or downlink can be indicated in any suitable manner such as e.g. indicated dynamically in the received DCI using a bit indication, indicated using a specific RNTI(s), indicated using a MAC CE, indicated semi-static signaling such as, e.g., Radio Resource Control (RRC) signaling, or the like.

In some embodiments, the aggregation factor to be used for bundling (e.g., for HARQ-disabled transmission) is configured, e.g., semi-statically (e.g., via RRC signaling). Further, in some embodiments, bundling is enabled for all transmissions using a HARQ process(es) for which HARQ mechanism(s) are disabled. Some examples of how HARQ mechanisms can be disabled are described in see U.S. Provisional Patent Application Ser. No. 62/737,630 filed Sep. 27, 2018, incorporated by reference.

In another embodiment, the New Data Indicator (NDI) field in the DCI scheduling a transmission for a specific HARQ process (e.g., indicated by a HARQ process ID) is used to indicate whether bundling is enabled for the HARQ process or not. When HARQ is disabled for certain HARQ process IDs using one or more of the mechanisms proposed in see U.S. Provisional Patent Application Ser. No. 62/737, 630 filed Sep. 27, 2018, incorporated by reference, the NDI fields for those HARQ processes may be redundant. The NDI fields for those HARQ processes can be repurposed, for example using new signaling (e.g., RRC signaling), to indicate whether or not bundling is activated for the respective HARQ processes.

Figure 4:
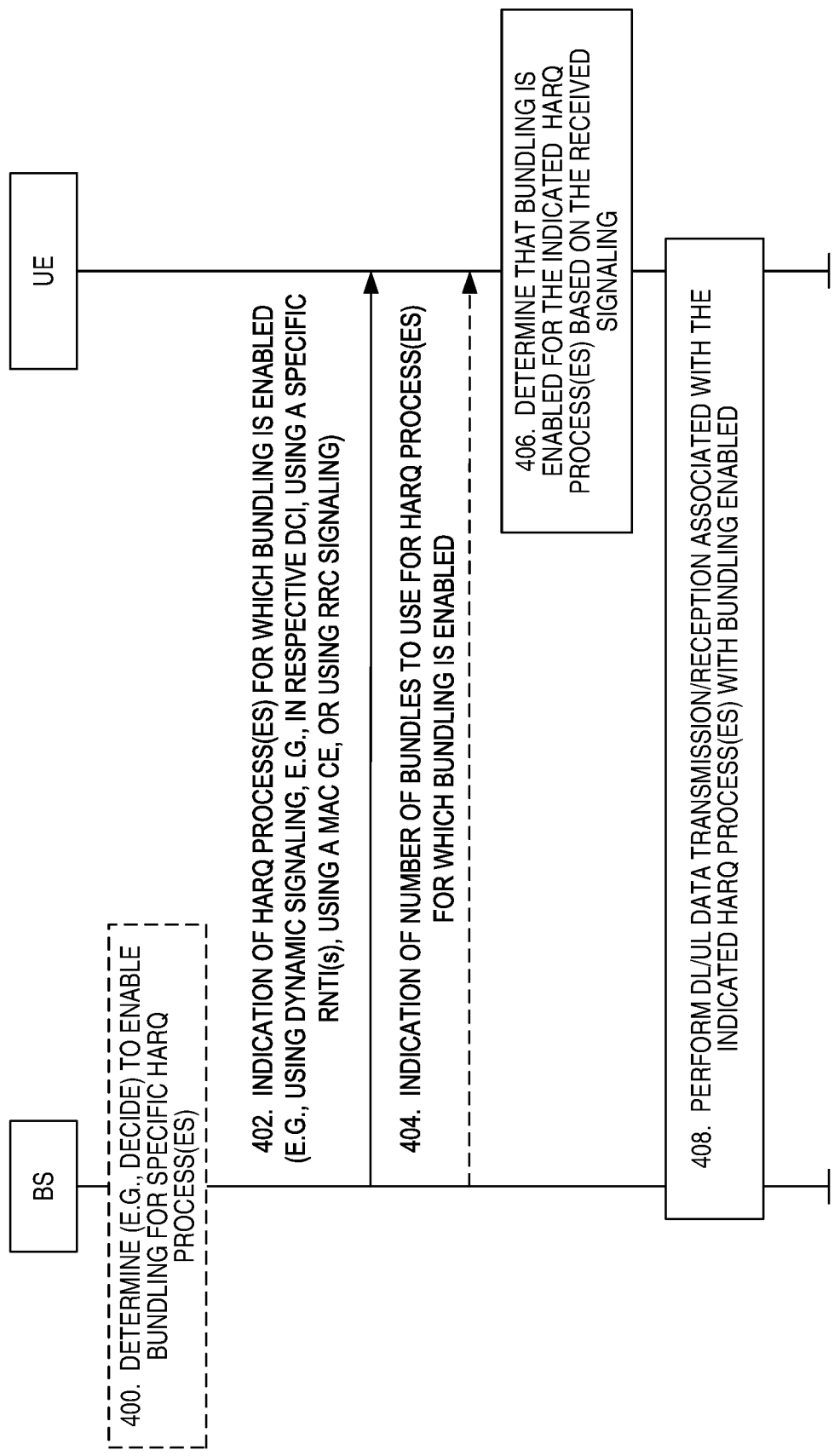
FIG. 4 illustrates the operation of a base station and a User Equipment (UE) in accordance with at least some aspects of some embodiment of the present disclosure (e.g. the embodiment denoted herein as "Embodiment 1")

FIG. 4 illustrates the operation of a base station 302 and a UE 308 in accordance with at least some aspects of Embodiment 1 described above. Optional steps are represented with dashed lines. As illustrated, the base station 302 optionally determines (e.g., decides) to enable bundling for a specific HARQ process(es) (step 400). For example, the base station 302 may determine to enable bundling for a HARQ process(es) for which HARQ mechanism(s) have been disabled. Notably, the HARQ process(es) for which bundling is enabled is a subset of all configured HARQ processes. The base station 402 provides an indication to the UE 302 of the HARQ process(es) for which bundling is enabled (step 402). This indication can be provided to the UE 308 in any suitable manner such as e.g. indicated dynamically in the received DCI using a bit indication, indicated using a specific RNTI(s), indicated using a MAC CE, indicated semi-static signaling such as, e.g., Radio Resource Control (RRC) signaling, or the like. Optionally, in some embodiments, the base station 302 also provides, to the UE 308, an indication of the number of bundles to use (step 404).

At the UE 308, the UE 308 receives the indication in step 402 and optionally the indication in step 404 and, based on the received indication(s), determines that bundling is enabled for the specific indicated HARQ process(es) (step 406). The UE 308 and the base station 312 then perform DL/UL data transmission/reception associated with the indicated HAR process(es) with bundling enabled (step 408).

Embodiment 2

In one embodiment, bundling of non-contiguous received/transmitted TBs is enabled for a specific HARQ process(es). If configured, this would allow the network or UE to send TBs with the same HARQ process ID not necessarily contiguously, i.e., non-contiguous bundling. This would allow the transmitter to spread transmissions to achieve time diversity and avoid temporary radio propagation obstacles such as fast fading and, if delay tolerable, even slow fading mechanisms.

The current NR specification states that if the UE is configured with aggregationFactor>1 (i.e., bundling is enabled), the same symbol allocation is applied across the aggregationFactor consecutive slots, and the UE may expect that the TB is repeated within each symbol allocation among each of the aggregationFactor consecutive slots.

A non-contiguous bundling pattern (i.e., a pattern that defines the location of the bundled TBs, e.g., in time (and optionally frequency)) can be indicated to the UE in any suitable manner such as e.g., by RRC, DCI bitmap, etc. or by a number of retransmissions plus NDI.

Example: The bundling is configured with a period of X slots, and the same symbol allocation is applied every X-th slot. As a result, the total transmission duration of a bundle is X*aggregationFactor slots.

Figure 5:
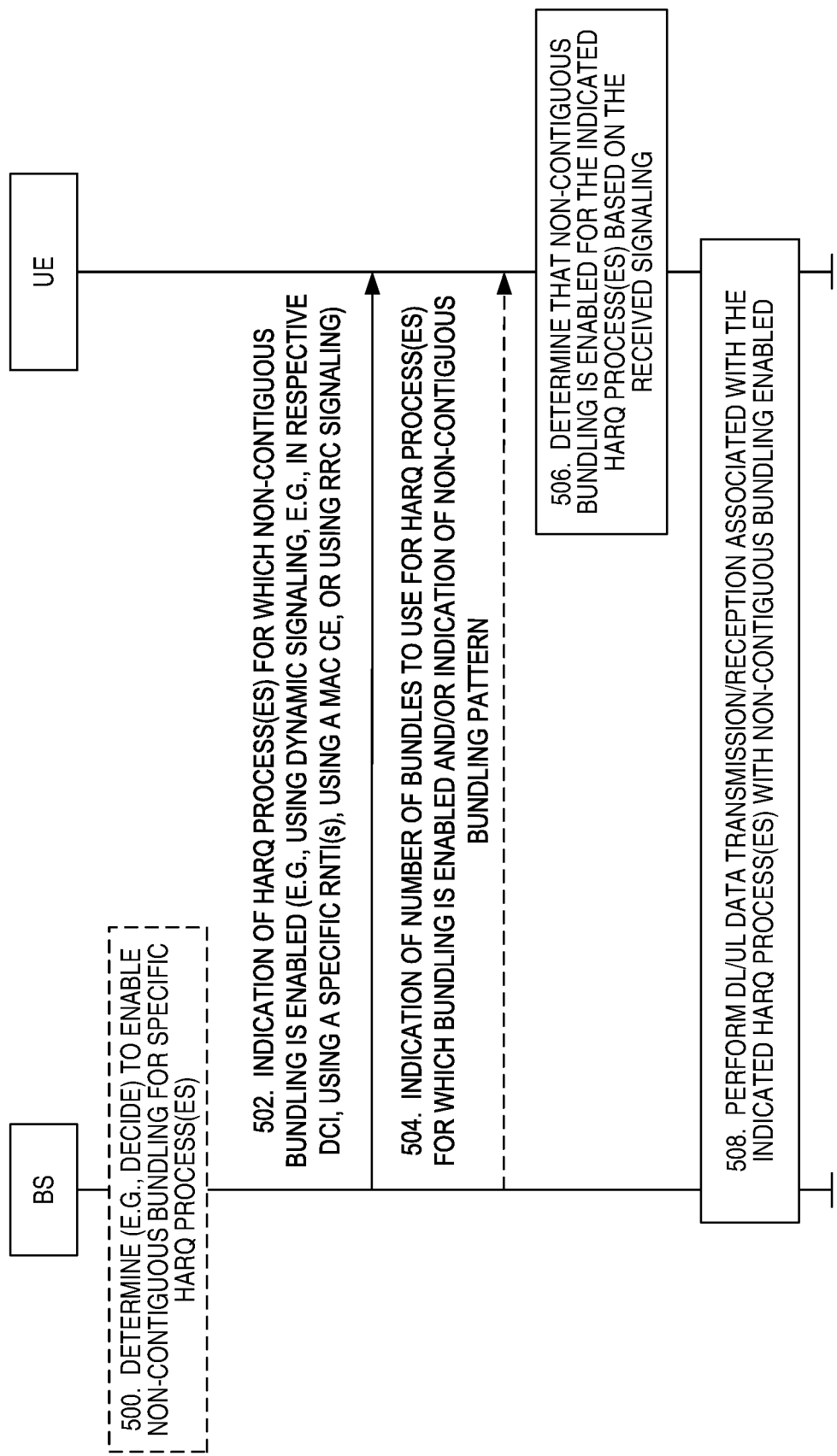
FIG. 5 illustrates the operation of a base station and a UE in accordance with at least some aspects of some embodiments of the present disclosure (e.g. the embodiment denoted herein as "Embodiment 2")

FIG. 5 illustrates the operation of a base station 302 and a UE 308 in accordance with at least some aspects of Embodiment 2 described above. Optional steps are represented with dashed lines. As illustrated, the base station 302 optionally determines (e.g., decides) to enable non-contiguous bundling for a specific HARQ process(es) (step 500). For example, the base station 302 may determine to enable non-contiguous bundling for a HARQ process(es) for which HARQ mechanism(s) have been disabled. Notably, the HARQ process(es) for which non-contiguous bundling is enabled is a subset of all configured HARQ processes. The base station 302 provides an indication to the UE 302 of the HARQ process(es) for which bundling is enabled (step 502). This indication can be provided to the UE 308 in any suitable manner such as e.g. indicated dynamically in the received DCI using a bit indication, indicated using a specific RNTI(s), indicated using a MAC CE, indicated semi-static signaling such as, e.g., Radio Resource Control (RRC) signaling, or the like. Optionally, in some embodiments, the base station 302 also provides, to the UE 308, an indication of the number of bundles to use and/or a non-contiguous bundling pattern(s) for the indicated HARQ process(es) (step 504).

At the UE 308, the UE 308 receives the indication in step 502 and optionally the indication in step 504 and, based on the received indication(s), determines that non-contiguous bundling is enabled for the specific indicated HARQ process(es) (step 506). The UE 308 and the base station 312 then perform DL/UL data transmission/reception associated with the indicated HAR process(es) with non-contiguous bundling enabled (step 508).

It should be noted that, in step 500, the base station 302 may determine to configure a first HARQ process for contiguous bundling and second HARQ process for non-contiguous bundling. In this case, the base station 302 can, for example, indicate to the UE 308 in step 502 that bundling is enabled for both the first and second HARQ processes. Then, the base station 302 may provide a further indication to the UE 308 that the bundling for the second HARQ process is non-contiguous, e.g., by indicating a respective non-contiguous bundling pattern to the UE 308, e.g., in step 504. Then, in step 408, contiguous bundling is used for the first HARQ process and non-contiguous bundling is used for the second HARQ process.

Embodiment 2A

The current NR specification requires generating possibly different redundancy versions of the TB, and a version of the TB is transmitted at each transmission occasion from the total of aggregationFactor transmission occasions in a bundle. In one embodiment, instead, the codeword could be directly generated, rate matched, modulated and mapped to all the resource elements from the available symbols assigned to the TB.

Example: DCI indicates the assignment of Y symbols in a slot using Z resource blocks. Bundling is configured with a period of X slots, and the same symbol allocation is applied every X-th slot. So in total, there would be 12*Z*Y*aggregationFactor resource elements minus not available resource elements (such as those used by reference signals). The codeword for the TB is generated, rate matched, and the corresponding bits are modulated and mapped to the available resource elements.

Embodiment 3

In one embodiment, a HARQ process timer for bundling of (non-) contiguous TBs is provided. Similar to bundling of X non-contiguous TBs for a certain HARQ process (e.g., identified by a certain HARQ process ID), the UE keeps monitoring for a specific HARQ process ID while the HARQ process timer is running. When the timer expires, the UE uses the received bundle of TBs, with possibly different redundancy versions, to decode the TB. The timer could be connected to each HARQ process, and the network (e.g. the base station 302) should not reuse the same HARQ process ID until the timer has expired or if the NDI is toggled. If configured, it would allow the network to send a TB multiple times depending on the load. For times of low load, more redundancy could be achieved and at high load, less redundancy. This embodiment can be used regardless of whether HARQ feedback is turned on or off (i.e., regardless of whether HARQ mechanism(s) are deactivated for the respective HARQ process).

Example: If HARQ process ID 4, 5 and 6 is configured for HARQ process ID bundling with a HARQ process timer set to X ms, the receiver would store all received TBs for a process ID, possibly with different redundancy version, until the timer expires. The received TBs would then be combined before decoding to reduce the probability of decoding error.

Figure 6:
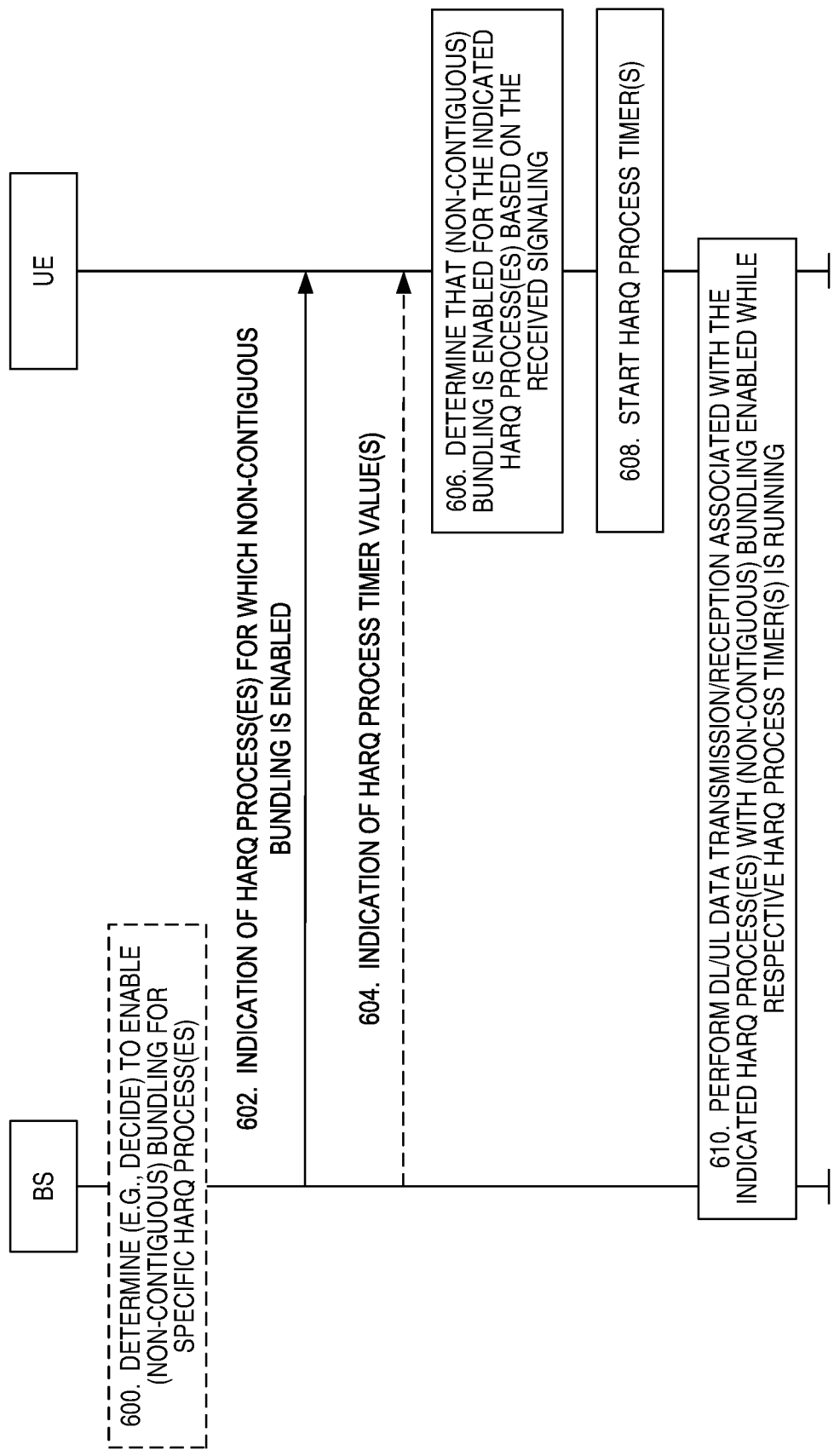
FIG. 6 illustrates the operation of a base station and a UE in accordance with at least some aspects of some embodiments of the present disclosure (e.g. the embodiment denoted herein as "Embodiment 3")

FIG. 6 illustrates the operation of a base station 302 and a UE 308 in accordance with at least some aspects of Embodiment 3 described above. Optional steps are represented with dashed lines. As illustrated, the base station 302 optionally determines (e.g., decides) to enable (non-contiguous) bundling for a specific HARQ process(es) (step 600). For example, the base station 302 may determine to enable (non-contiguous) bundling for a HARQ process(es) for which HARQ mechanism(s) have been disabled. Notably, the HARQ process(es) for which (non-contiguous) bundling is enabled is a subset of all configured HARQ processes. The base station 302 provides an indication to the UE 302 of the HARQ process(es) for which bundling is enabled (step 602). This indication can be provided to the UE 308 in any suitable manner such as e.g. indicated dynamically in the received DCI using a bit indication, indicated using a specific RNTI(s), indicated using a MAC CE, indicated semi-static signaling such as, e.g., Radio Resource Control (RRC) signaling, or the like. Optionally, in some embodiments, the base station 302 also provides, to the UE 308, an indication HARQ process timer value(s) for the HARQ process(es) for which bundling is enabled (step 604). This indication may be provided to the UE 308 in any suitable manner such as, e.g., dynamically in the received DCI using a bit indication, using a specific RNTI(s), using a MAC CE, using semi-static signaling such as, e.g., Radio Resource Control (RRC) signaling, or the like. Note that if bundling is enabled for two or more specific HARQ processes, a single HARQ process timer value may be indicated for all of these HARQ processes or separate HARQ process timer values may be indicated for the separate HARQ processes.

At the UE 308, the UE 308 receives the indication in step 602 and optionally the indication in step 604 and, based on the received indication(s), determines that bundling is enabled for the specific indicated HARQ process(es) (step 606). The UE 308 starts a HARQ process timer(s) for the indicated HARQ process(es), where the HARQ process timer(s) is set to a value(s) indicated by the base station 302 in step 604 or set to value(s) that are otherwise defined for configured. The UE 308 and the base station 312 then perform DL/UL data transmission/reception associated with the indicated HAR process(es) with bundling enabled while the respective HARQ process timer(s) is running (step 508).

Embodiment 4

Here, a number of example variations for how HARQ process specific bundling is indicated to the UE 308 are described.

In some embodiment, RRC is used to provide the indication to enable bundling for a specific HARQ process(es). Two examples of RRC configuration are as follows:
1. For example, in some embodiments, the RRC configuration can include a table that includes, for each configured HARQ process: (a) the number of repetitions (e.g., the aggregation factor for the HARQ process), (b) an indication of whether HARQ is disabled or not for the specific HARQ process, and/or (c) an indication as to whether non-contiguous bundling is allowed for the HARQ process.
2. As another example, the RRC configuration can include configuration for only the specific HARQ process(es) for which HARQ mechanism(s) have been disabled. Instead of indicating for which HARQ process IDs HARQ has been turned off, this can be implicitly determined.
   a. Example: If 4 Information Elements (IEs) are included in the RRC configuration, then the HARQ process IDs 0, 1, 2, 3 have been turned off and the corresponding bundling in those IEs should be used according to the order of the IEs.

In some other embodiments, a combination of RRC and MAC CE or a combination of RRC and DCI is used to configure bundling for a specific HARQ process(es).

In some other embodiments, RRC configures a set of bundling and HARQ on/off states for given HARQ process or common to all HARQ processes. MAC CE or DCI may then indicate which of the preconfigured states becomes active/deactive. Option 1 is that each HARQ process is configured with N possible states, where one state can mean bundling is assumed and no HARQ, or bundling is assumed and HARQ is also enabled. Option 2, the configuration state is common for all HARQ processes and MAC CE or DCI indicated which state is assumed for the UE. The states may be indexed such that those can be referred by MAC CE or predefined ordering is assumed. E.g. first bit in MAC CE refers to first state in the list of configured states.

In some other embodiments, a combination of RRC and RNTI to activate/deactivate bundling for a specific HARQ process(es) is used.

In some other embodiments, DCI is used to configure bundling for a specific HARQ process(es).

In some other embodiments, given the mapping that configures the amount of bundles for each HARQ process ID, in MAC CE or DCI the amount of bundling on each HARQ process is controlled by either signalling increase, decrease or maintain. As an example, if the current bundling number is 32 for HARQ process ID 4, then if MAC CE signals an increase on HARQ process ID then the bundling number is increased to 64.

Embodiment 5

In case a UE is configured with bundling in both contiguous or non-contiguous mode, the UE can try to decode the data after each received TB within the bundle. In case the UE is able to decode the data, it can discard future TBs within the same bundle (same HARQ process ID), this will lead to energy savings at the UE side. Optionally, the UE can feedback to the NW indicating successful transmission of the TB and thus NW could terminate transmission early (instead of blindly sending aggregationFactor times of the TB).

Since the network is interested in sending as much information as possible, while minimizing the resource overhead. The UE can feedback the decoding information of the bundle to enable the network to set optimal TB sizes, bundling parameters, MCS, in order to optimize the resource utilization for future communication with said UE. The UE reported feedback could be, e.g.:
  the number of used TBs within the bundle needed to decode the data,
  indices of the needed TBs to decode the data, and/or
  signal quality information of each TB.

Embodiment 6

A parameter for logical channel prioritization, LCP, that can be indicated in e.g. a grant is provided. If this indication is included, the UE may only include data from specific LCH that are allowed to send data on HARQ processes with HARQ Feedback disabled. If not included, any LCH are valid for the grant.

Example: HARQ process IDs 4 and 5 are configured to not send HARQ feedback. A grant is received in the UE to be used together with HARQ process ID=4. The LCP in the is then only allowed to include data from LCHs that indicates that data from these buffers are ok to be sent without feedback.

Figure 7:
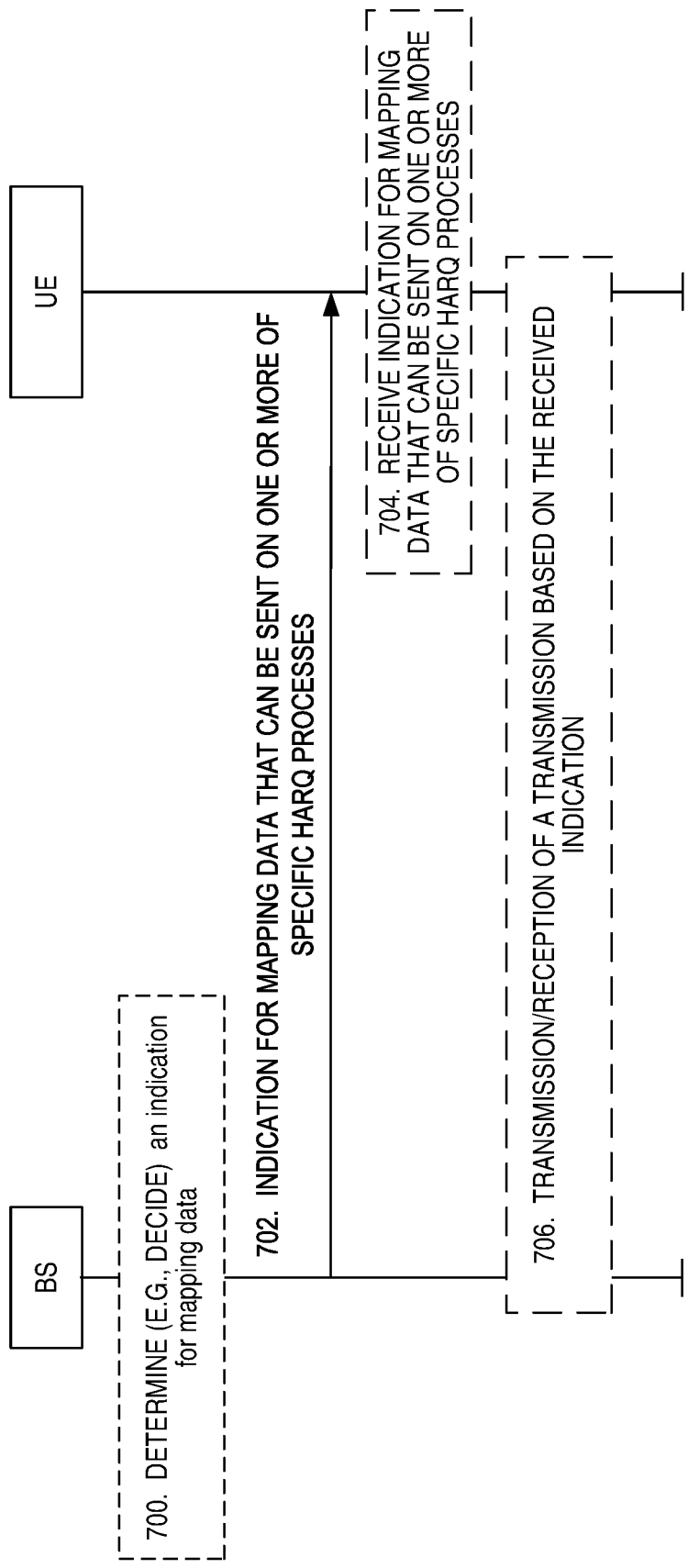
FIG. 7 illustrates the operation of a base station 302 and a UE 308 in accordance with at least some aspects of some embodiments of the present disclosure (e.g. the embodiment denoted herein as "Embodiment 6")

FIG. 7 illustrates the operation of a base station 302 and a UE 308 in accordance with at least some aspects of Embodiment 6. Optional steps are represented with dashed lines. As illustrated, the base station 302 optionally determines (e.g., decides) an indication for mapping data (step 700). The base station 302 provides to the UE 302 of an indication for mapping data that can be sent on one or more of specific HARQ processes (step 702). This indication can be provided to the UE 308 in any suitable manner such as e.g. in a grant, indicated dynamically in the received DCI using a bit indication, indicated using a specific RNTI(s), indicated using a MAC CE, indicated semi-static signaling such as, e.g., Radio Resource Control (RRC) signaling, or the like.

At the UE 308, the UE 308 receives the indication in step 702 (step 704). The UE 308 and the base station 312 then perform transmission/reception of a transmission based on the received indication (step 706).

Embodiment 7

In some embodiments, a repetition is configured for a certain logical channel with a certain logical channel priority. This can be configured directly by RRC in LogicalChannelConfig IE with a parameter giving the repetition order. This means then when receiving MAC SDU from such logical channel, MAC entity forms the configured number of MAC PDUs of the same MAC SDU.

Additional Description Applicable to All Embodiments

Figure 8:
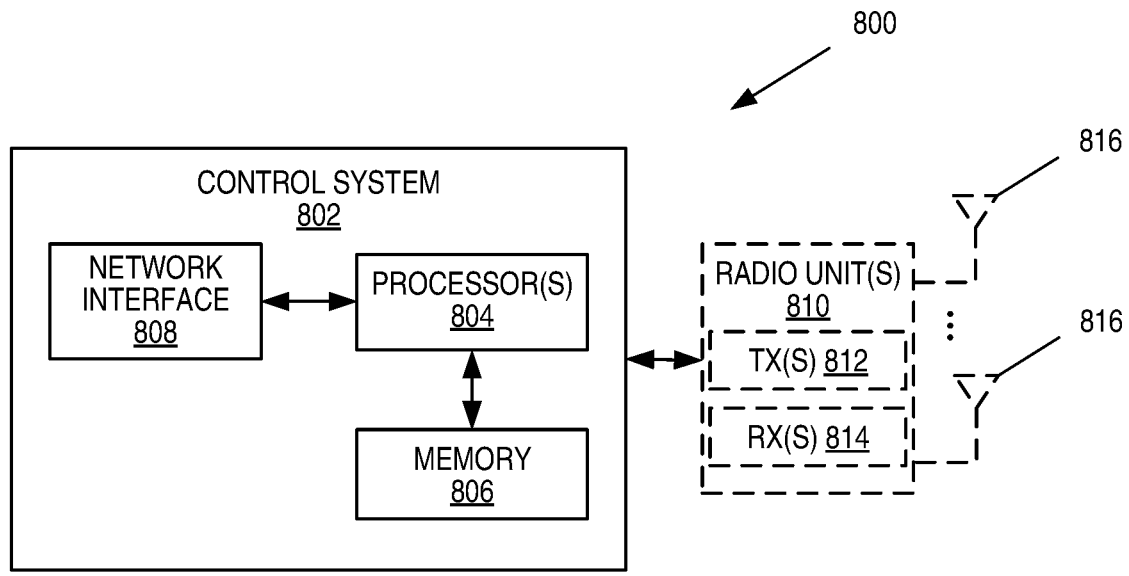
FIG. 8 through 10 illustrate example embodiments of a radio access node.

FIG. 8 is a schematic block diagram of a radio access node 800 according to some embodiments of the present disclosure. The radio access node 800 may be, for example, the base station 302 or the combination of the base station 302 and the base station antenna 304 described above. As illustrated, the radio access node 800 includes a control system 802 that includes one or more processors 804 (e.g., Central Processing Units (CPUs), Application Specific Integrated Circuits (ASICs), Field Programmable Gate Arrays (FPGAs), and/or the like), memory 806, and a network interface 808. The one or more processors 804 are also referred to herein as processing circuitry. In addition, in some embodiments, the radio access node 800 includes one or more radio units 810 that each includes one or more transmitters 812 and one or more receivers 814 coupled to one or more antennas 816. The radio units 810 may be referred to or be part of radio interface circuitry. In some embodiments, the radio unit(s) 810 is external to the control system 802 and connected to the control system 802 via, e.g., a wired connection (e.g., an optical cable). For example, the control system 802 may be implemented in the base station 302, and the radio unit(s) 810 and antennas 816 may be implemented in the base station antenna 304. However, in some other embodiments, the radio unit(s) 810 and potentially the antenna(s) 816 are integrated together with the control system 802. The one or more processors 804 operate to provide one or more functions of a radio access node 800 (e.g., one or more functions of the base station, eNB, or gNB) as described herein. In some embodiments, the function(s) are implemented in software that is stored, e.g., in the memory 806 and executed by the one or more processors 804.

Figure 9:
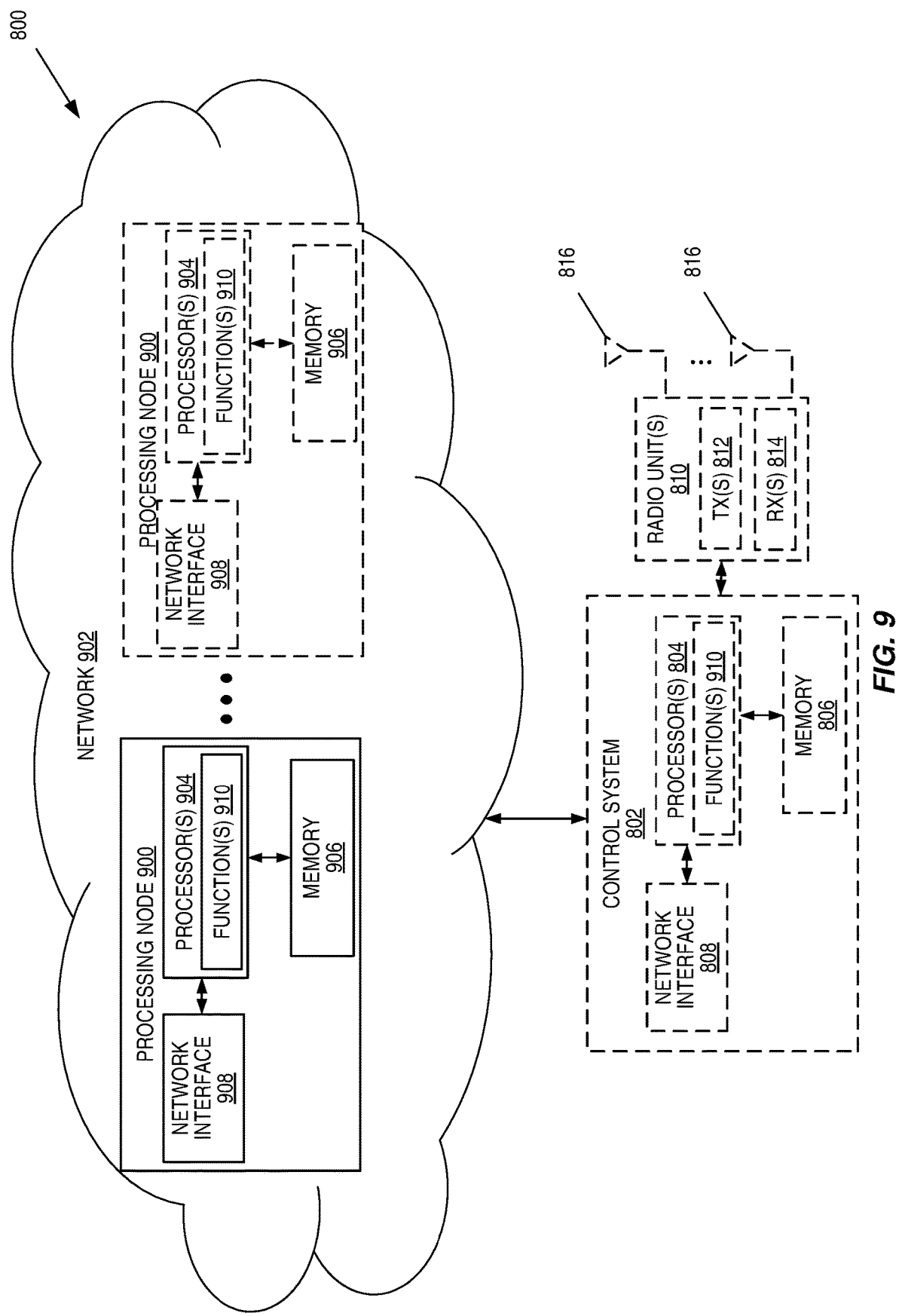

FIG. 9 is a schematic block diagram that illustrates a virtualized embodiment of the radio access node 800 according to some embodiments of the present disclosure. This discussion is equally applicable to other types of network nodes. Further, other types of network nodes may have similar virtualized architectures.

As used herein, a "virtualized" radio access node is an implementation of the radio access node 800 in which at least a portion of the functionality of the radio access node 800 is implemented as a virtual component(s) (e.g., via a virtual machine(s) executing on a physical processing node(s) in a network(s)). As illustrated, in this example, the radio access node 800 includes one or more processing nodes 900 coupled to or included as part of a network(s) 902 via the network interface 808. Each processing node 900 includes one or more processors 904 (e.g., CPUs, ASICs, FPGAs, and/or the like), memory 906, and a network interface 908. Optionally, the radio access node 800 includes the control system 802 and/or the radio unit(s) 810, depending on the particular implementation.

In this example, functions 910 of the radio access node 800 described herein (e.g., functions of the base station, eNB, or gNB described herein) are implemented at the one or more processing nodes 900 or distributed across the control system 802 and the one or more processing nodes 900 in any desired manner. In some particular embodiments, some or all of the functions 910 of the radio access node 800 described herein are implemented as virtual components executed by one or more virtual machines implemented in a virtual environment(s) hosted by the processing node(s) 900. Notably, in some embodiments, the control system 802 may not be included, in which case the radio unit(s) 810 can communicate directly with the processing node(s) 900 via an appropriate network interface(s).

In some embodiments, a computer program including instructions which, when executed by at least one processor, causes the at least one processor to carry out the functionality of radio access node 800 or a node (e.g., a processing node 900) implementing one or more of the functions 910 of the radio access node 800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
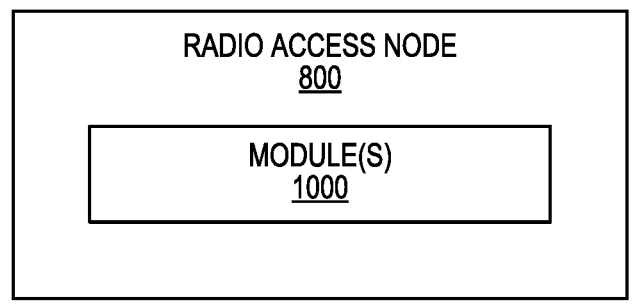

FIG. 10 is a schematic block diagram of the radio access node 800 according to some other embodiments of the present disclosure. The radio access node 800 includes one or more modules 1000, each of which is implemented in software. The module(s) 1000 provide the functionality of the radio access node 800 described herein. This discussion is equally applicable to the processing node 900 of FIG. 9 where the modules 1000 may be implemented at one of the processing nodes 900 or distributed across multiple processing nodes 900 and/or distributed across the processing node(s) 900 and the control system 802.

Figure 11:
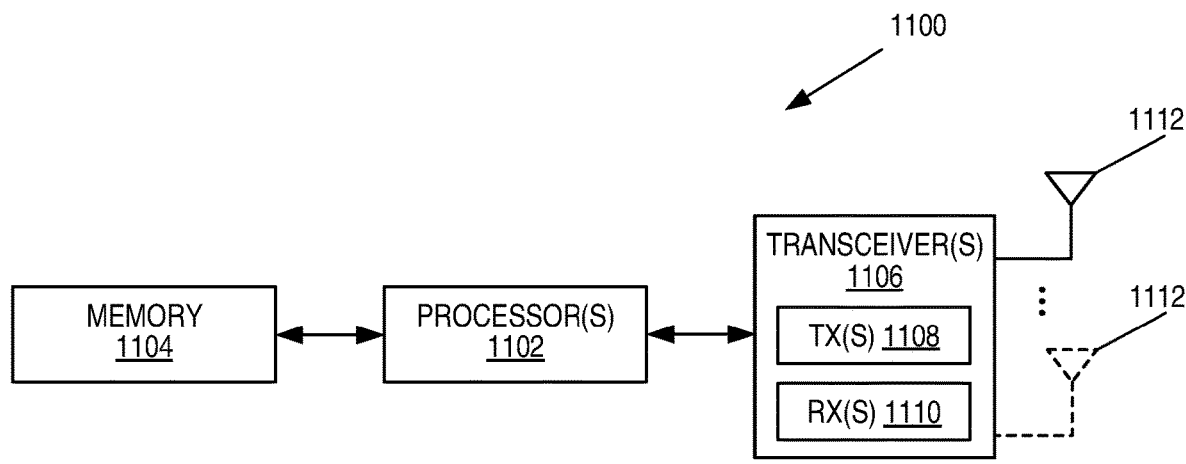
FIGS. 11 and 12 illustrate example embodiments of a UE.

FIG. 11 is a schematic block diagram of a UE 1100 according to some embodiments of the present disclosure. As illustrated, the UE 1100 includes one or more processors 1102 (e.g., CPUs, ASICs, FPGAs, and/or the like), memory 1104, and one or more transceivers 1106 each including one or more transmitters 1108 and one or more receivers 1110 coupled to one or more antennas 1112. The transceiver(s) 1106 includes radio-front end circuitry connected to the antenna(s) 1112 that is configured to condition signals communicated between the antenna(s) 1112 and the processor(s) 1102, as will be appreciated by on of ordinary skill in the art. The processors 1102 are also referred to herein as processing circuitry. The transceivers 1106 are also referred to herein as radio circuitry. In some embodiments, the functionality of the UE 1100 (i.e., the functionality of the UE) described above may be fully or partially implemented in software that is, e.g., stored in the memory 1104 and executed by the processor(s) 1102. Note that the UE 1100 may include additional components not illustrated in FIG. 11 such as, e.g., one or more user interface components (e.g., an input/output interface including a display, buttons, a touch screen, a microphone, a speaker(s), and/or the like and/or any other components for allowing input of information into the UE 1100 and/or allowing output of information from the UE 1100), a power supply (e.g., a battery and associated power circuitry), etc.

In some embodiments, a computer program including instructions which, when executed by at least one processor, causes the at least one processor to carry out the functionality of the UE 1100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 12:
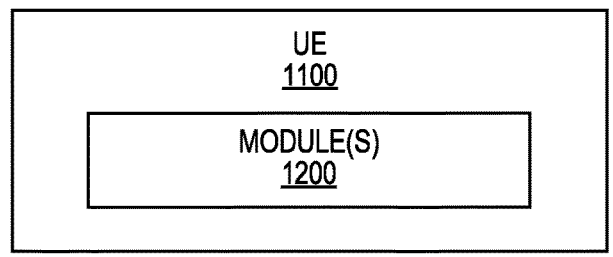

FIG. 12 is a schematic block diagram of the UE 1100 according to some other embodiments of the present disclosure. The UE 1100 includes one or more modules 1200, each of which is implemented in software. The module(s) 1200 provide the functionality of the UE 1100 described herein.

Figure 13:
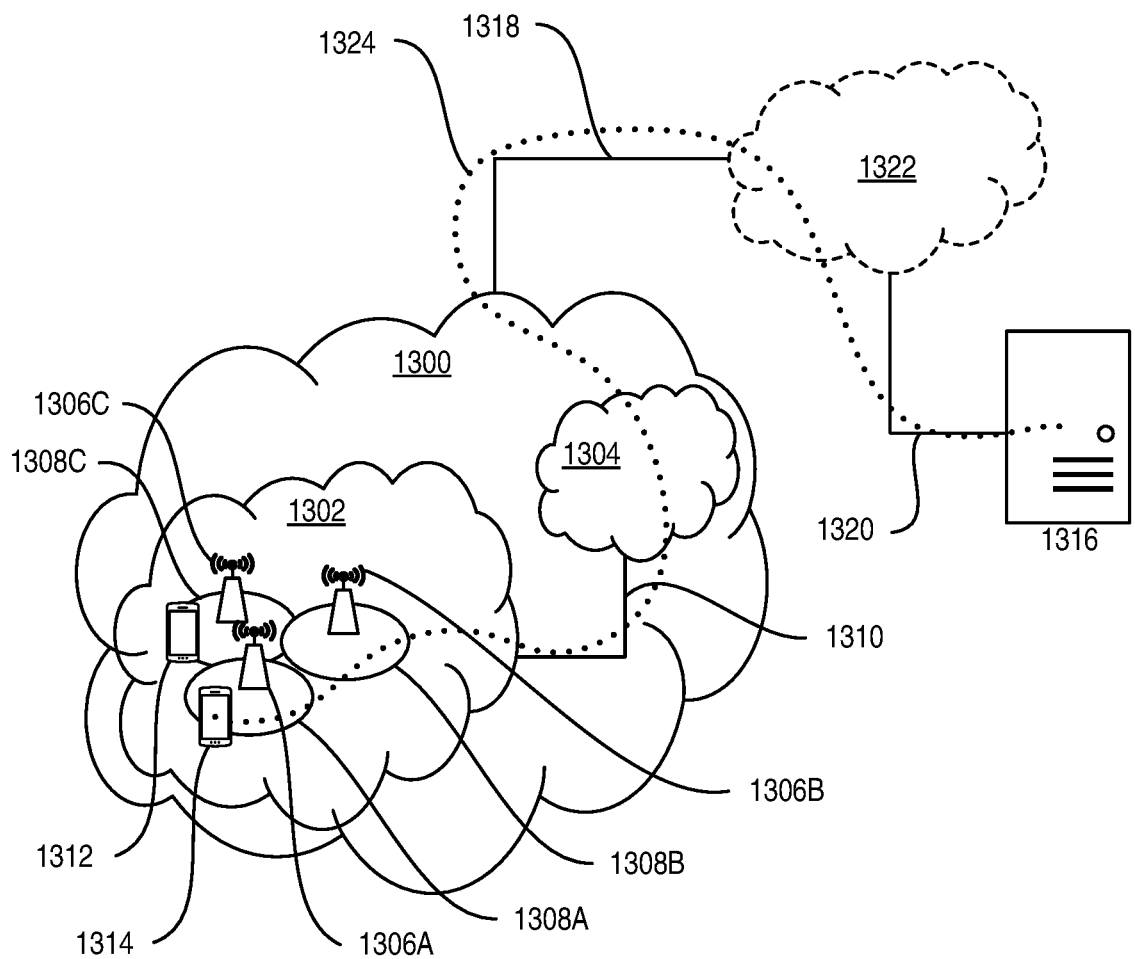
FIG. 13 illustrates a communication system including a telecommunication network, which comprises an access network and a core network, in which embodiments of the present disclosure may be implemented.

With reference to FIG. 13, in accordance with an embodiment, a communication system includes a telecommunication network 1300, such as a 3GPP-type cellular network, which comprises an access network 1302, such as a RAN, and a core network 1304. The access network 1302 comprises a plurality of base stations 1306A, 1306B, 1306C, such as NBs, eNBs, gNBs, or other types of wireless Access Points (APs), each defining a corresponding coverage area 1308A, 1308B, 1308C. Each base station 1306A, 1306B, 1306C is connectable to the core network 1304 over a wired or wireless connection 1310. A first UE 1312 located in coverage area 1308C is configured to wirelessly connect to, or be paged by, the corresponding base station 1306C. A second UE 1314 in coverage area 1308A is wirelessly connectable to the corresponding base station 1306A. While a plurality of UEs 1312, 1314 are illustrated in this example, the disclosed embodiments are equally applicable to a situation where a sole UE is in the coverage area or where a sole UE is connecting to the corresponding base station 1306.

The telecommunication network 1300 is itself connected to a host computer 1316, which may be embodied in the hardware and/or software of a standalone server, a cloud-implemented server, a distributed server, or as processing resources in a server farm. The host computer 1316 may be under the ownership or control of a service provider, or may be operated by the service provider or on behalf of the service provider. Connections 1318 and 1320 between the telecommunication network 1300 and the host computer 1316 may extend directly from the core network 1304 to the host computer 1316 or may go via an optional intermediate network 1322. The intermediate network 1322 may be one of, or a combination of more than one of, a public, private, or hosted network; the intermediate network 1322, if any, may be a backbone network or the Internet; in particular, the intermediate network 1322 may comprise two or more sub-networks (not shown).

The communication system of FIG. 13 as a whole enables connectivity between the connected UEs 1312, 1314 and the host computer 1316. The connectivity may be described as an Over-the-Top (OTT) connection 1324. The host computer 1316 and the connected UEs 1312, 1314 are configured to communicate data and/or signaling via the OTT connection 1324, using the access network 1302, the core network 1304, any intermediate network 1322, and possible further infrastructure (not shown) as intermediaries. The OTT connection 1324 may be transparent in the sense that the participating communication devices through which the OTT connection 1324 passes are unaware of routing of uplink and downlink communications. For example, the base station 1306 may not or need not be informed about the past routing of an incoming downlink communication with data originating from the host computer 1316 to be forwarded (e.g., handed over) to a connected UE 1312. Similarly, the base station 1306 need not be aware of the future routing of an outgoing uplink communication originating from the UE 1312 towards the host computer 1316.

Example implementations, in accordance with an embodiment, of the UE, base station, and host computer discussed in the preceding paragraphs will now be described with reference to FIG. 14. In a communication system 1400, a host computer 1402 comprises hardware 1404 including a communication interface 1406 configured to set up and maintain a wired or wireless connection with an interface of a different communication device of the communication system 1400. The host computer 1402 further comprises processing circuitry 1408, which may have storage and/or processing capabilities. In particular, the processing circuitry 1408 may comprise one or more programmable processors, ASICs, FPGAs, or combinations of these (not shown) adapted to execute instructions. The host computer 1402 further comprises software 1410, which is stored in or accessible by the host computer 1402 and executable by the processing circuitry 1408. The software 1410 includes a host application 1412. The host application 1412 may be operable to provide a service to a remote user, such as a UE 1414 connecting via an OTT connection 1416 terminating at the UE 1414 and the host computer 1402. In providing the service to the remote user, the host application 1412 may provide user data which is transmitted using the OTT connection 1416.

The communication system 1400 further includes a base station 1418 provided in a telecommunication system and comprising hardware 1420 enabling it to communicate with the host computer 1402 and with the UE 1414. The hardware 1420 may include a communication interface 1422 for setting up and maintaining a wired or wireless connection with an interface of a different communication device of the communication system 1400, as well as a radio interface 1424 for setting up and maintaining at least a wireless connection 1426 with the UE 1414 located in a coverage area (not shown in FIG. 14) served by the base station 1418. The communication interface 1422 may be configured to facilitate a connection 1428 to the host computer 1402. The connection 1428 may be direct or it may pass through a core network (not shown in FIG. 14) of the telecommunication system and/or through one or more intermediate networks outside the telecommunication system. In the embodiment shown, the hardware 1420 of the base station 1418 further includes processing circuitry 1430, which may comprise one or more programmable processors, ASICs, FPGAs, or combinations of these (not shown) adapted to execute instructions. The base station 1418 further has software 1432 stored internally or accessible via an external connection.

The communication system 1400 further includes the UE 1414 already referred to. The UE's 1414 hardware 1434 may include a radio interface 1436 configured to set up and maintain a wireless connection 1426 with a base station serving a coverage area in which the UE 1414 is currently located. The hardware 1434 of the UE 1414 further includes processing circuitry 1438, which may comprise one or more programmable processors, ASICs, FPGAs, or combinations of these (not shown) adapted to execute instructions. The UE 1414 further comprises software 1440, which is stored in or accessible by the UE 1414 and executable by the processing circuitry 1438. The software 1440 includes a client application 1442. The client application 1442 may be operable to provide a service to a human or non-human user via the UE 1414, with the support of the host computer 1402. In the host computer 1402, the executing host application 1412 may communicate with the executing client application 1442 via the OTT connection 1416 terminating at the UE 1414 and the host computer 1402. In providing the service to the user, the client application 1442 may receive request data from the host application 1412 and provide user data in response to the request data. The OTT connection 1416 may transfer both the request data and the user data. The client application 1442 may interact with the user to generate the user data that it provides.

Figure 14:
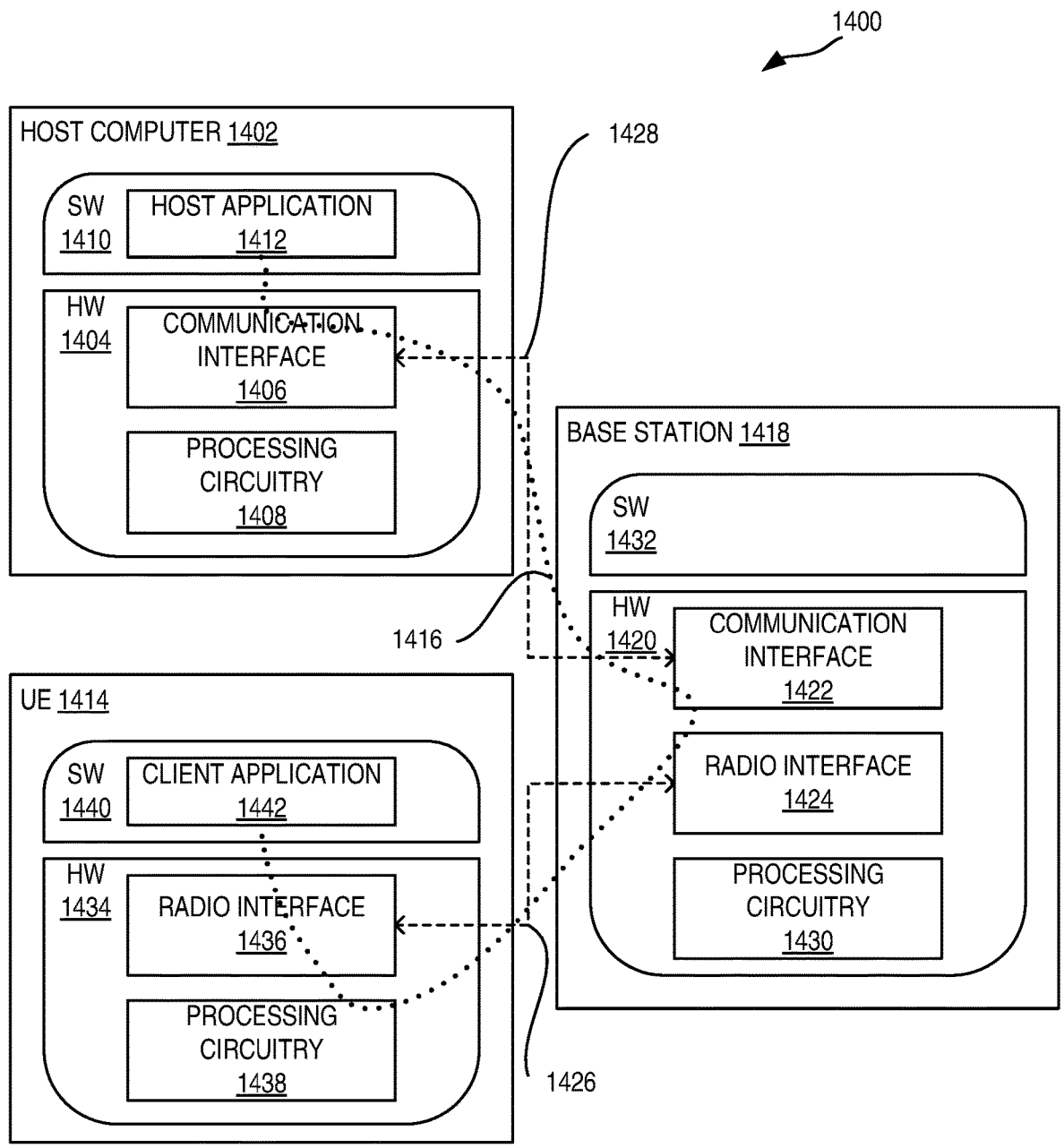
FIG. 14 illustrates example implementations, in accordance with an embodiment, of the UE, base station, and host computer of FIG. 13.

It is noted that the host computer 1402, the base station 1418, and the UE 1414 illustrated in FIG. 14 may be similar or identical to the host computer 1316, one of the base stations 1306A, 1306B, 1306C, and one of the UEs 1312, 1314 of FIG. 13, respectively. This is to say, the inner workings of these entities may be as shown in FIG. 14 and independently, the surrounding network topology may be that of FIG. 13.

In FIG. 14, the OTT connection 1416 has been drawn abstractly to illustrate the communication between the host computer 1402 and the UE 1414 via the base station 1418 without explicit reference to any intermediary devices and the precise routing of messages via these devices. The network infrastructure may determine the routing, which may be configured to hide from the UE 1414 or from the service provider operating the host computer 1402, or both. While the OTT connection 1416 is active, the network infrastructure may further take decisions by which it dynamically changes the routing (e.g., on the basis of load balancing consideration or reconfiguration of the network).

The wireless connection 1426 between the UE 1414 and the base station 1418 is in accordance with the teachings of the embodiments described throughout this disclosure. One or more of the various embodiments improve the performance of OTT services provided to the UE 1414 using the OTT connection 1416, in which the wireless connection 1426 forms the last segment. More precisely, the teachings of these embodiments may improve e.g., data rate, latency, and/or power consumption and thereby provide benefits such as e.g., reduced user waiting time, relaxed restriction on file size, better responsiveness, and/or extended battery lifetime.

A measurement procedure may be provided for the purpose of monitoring data rate, latency, and other factors on which the one or more embodiments improve. There may further be an optional network functionality for reconfiguring the OTT connection 1416 between the host computer 1402 and the UE 1414, in response to variations in the measurement results. The measurement procedure and/or the network functionality for reconfiguring the OTT connection 1416 may be implemented in the software 1410 and the hardware 1404 of the host computer 1402 or in the software 1440 and the hardware 1434 of the UE 1414, or both. In some embodiments, sensors (not shown) may be deployed in or in association with communication devices through which the OTT connection 1416 passes; the sensors may participate in the measurement procedure by supplying values of the monitored quantities exemplified above, or supplying values of other physical quantities from which the software 1410, 1440 may compute or estimate the monitored quantities. The reconfiguring of the OTT connection 1416 may include message format, retransmission settings, preferred routing, etc.; the reconfiguring need not affect the base station 1418, and it may be unknown or imperceptible to the base station 1418. Such procedures and functionalities may be known and practiced in the art. In certain embodiments, measurements may involve proprietary UE signaling facilitating the host computer 1402's measurements of throughput, propagation times, latency, and the like. The measurements may be implemented in that the software 1410 and 1440 causes messages to be transmitted, in particular empty or 'dummy' messages, using the OTT connection 1416 while it monitors propagation times, errors, etc.

Figures 15, 16:
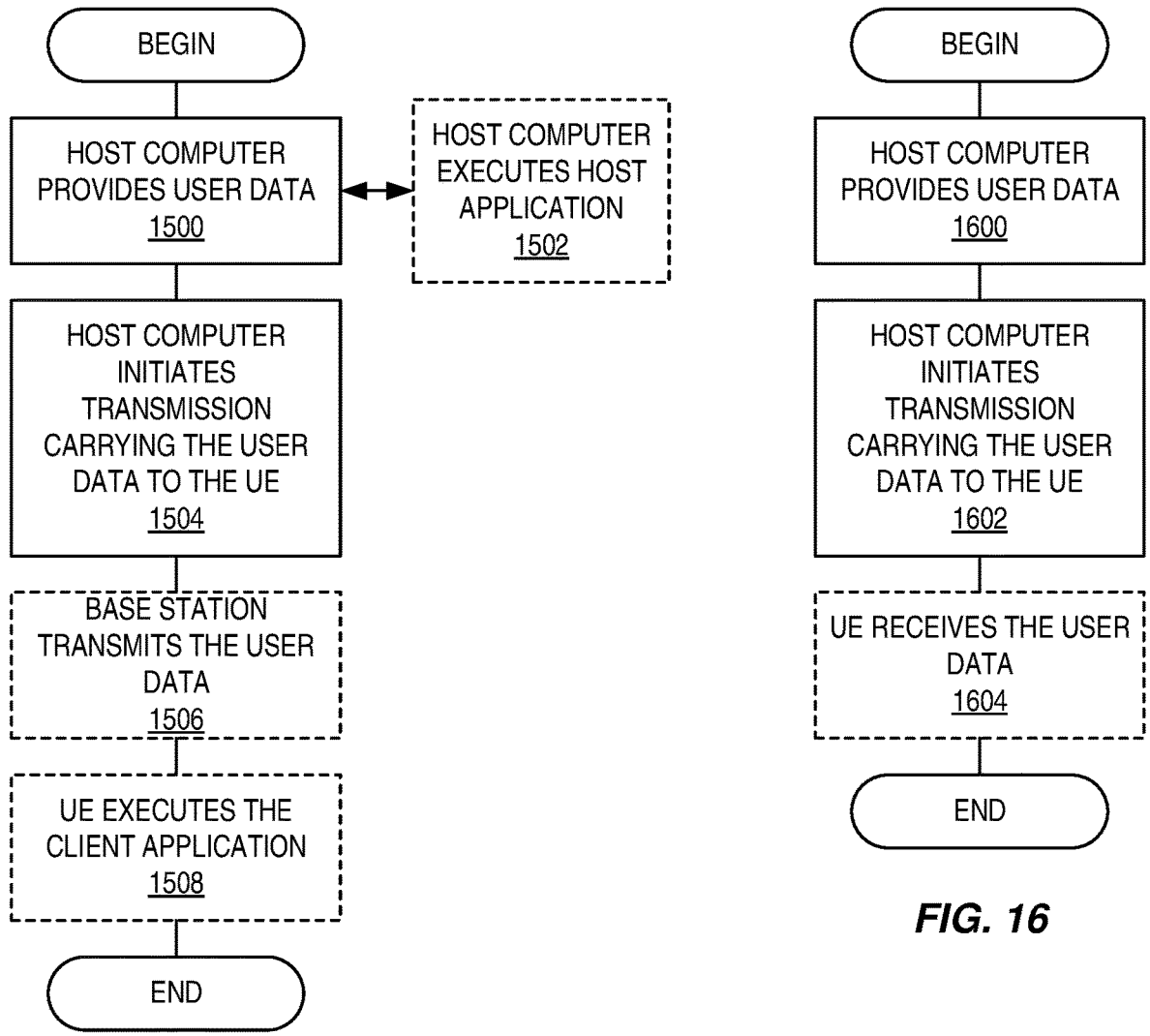

FIG. 15 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 15 will be included in this section. In step 1500, the host computer provides user data. In sub-step 1502 (which may be optional) of step 1500, the host computer provides the user data by executing a host application. In step 1504, the host computer initiates a transmission carrying the user data to the UE. In step 1506 (which may be optional), the base station transmits to the UE the user data which was carried in the transmission that the host computer initiated, in accordance with the teachings of the embodiments described throughout this disclosure. In step 1508 (which may also be optional), the UE executes a client application associated with the host application executed by the host computer.

FIG. 16 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 16 will be included in this section. In step 1600 of the method, the host computer provides user data. In an optional sub-step (not shown) the host computer provides the user data by executing a host application. In step 1602, the host computer initiates a transmission carrying the user data to the UE. The transmission may pass via the base station, in accordance with the teachings of the embodiments described throughout this disclosure. In step 1604 (which may be optional), the UE receives the user data carried in the transmission.

FIG. 17 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 17 will be included in this section. In step 1700 (which may be optional), the UE receives input data provided by the host computer. Additionally or alternatively, in step 1702, the UE provides user data. In sub-step 1704 (which may be optional) of step 1700, the UE provides the user data by executing a client application. In sub-step 1706 (which may be optional) of step 1702, the UE executes a client application which provides the user data in reaction to the received input data provided by the host computer. In providing the user data, the executed client application may further consider user input received from the user. Regardless of the specific manner in which the user data was provided, the UE initiates, in sub-step 1708 (which may be optional), transmission of the user data to the host computer. In step 1710 of the method, the host computer receives the user data transmitted from the UE, in accordance with the teachings of the embodiments described throughout this disclosure.

FIG. 18 is a flowchart illustrating a method implemented in a communication system, in accordance with one embodiment. The communication system includes a host computer, a base station, and a UE which may be those described with reference to FIGS. 13 and 14. For simplicity of the present disclosure, only drawing references to FIG. 18 will be included in this section. In step 1800 (which may be optional), in accordance with the teachings of the embodiments described throughout this disclosure, the base station receives user data from the UE. In step 1802 (which may be optional), the base station initiates transmission of the received user data to the host computer. In step 1804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

Group S Embodiments

1. A method performed by a wireless device for mapping data to specific HARQ processes, the method comprising at least one of:
   receiving (WT402) an indication that maps data that can be sent on one or more of specific HARQ processes; and
   transmitting/receiving (WT406) a transmission for the specific HARQ process based on the received indication.
2. The method of embodiment 1 wherein the indication comprises a parameter for logical channel prioritization, LCP.
3. The method of embodiment 1 or 2 wherein the indication is a grant or within a grant.
4. The method of any one of embodiments 1 to 3 further comprising including only data from specific logical channels, LCH, that are allowed to send data on HARQ processes with HARQ feedback disabled, based on the received indication.
5. The method of any one of embodiments 1 to 3 wherein based on the received indication and/or absence of a received indication, the wireless device interprets that any logical channel, LCH, is valid for a grant.
6. The method of embodiment 1 or 2 further comprising receiving (WT104), from the base station, an indication of a number of repetitions to use for bundling for the specific HARQ process.

Group T Embodiments

7. A method performed by a base station for mapping data to specific HARQ processes, the method comprising at least one of:
   determining (e.g., deciding) an indication for mapping data (step WT400). sending (WT402) to a user equipment an indication that maps data that can be sent on one or more of specific HARQ processes.
8. The method of embodiment 1 wherein the indication comprises a parameter for logical channel prioritization, LCP.
9. The method of embodiment 1 or 2 wherein the indication is a grant or within a grant.
10. The method of any one of embodiments 1 to 3 further comprising including only data from specific logical channels, LCH, that are allowed to send data on HARQ processes with HARQ feedback disabled, based on the received indication.
11. The method of any one of embodiments 1 to 3 wherein based on the received indication and/or absence of a received indication, the wireless device interprets that any logical channel, LCH, is valid for a grant.
12. The method of embodiment 1 or 2 further comprising receiving (WT104), from the base station, an indication of a number of repetitions to use for bundling for the specific HARQ process.

Group A Embodiments

1. A method performed by a wireless device for enabling bundling for a specific HARQ process, the method comprising at least one of: receiving (402, 502, 602), from a base station, an indication that bundling of transport blocks is enabled for a specific HARQ process (or a specific subset of all configured HARQ processes); determining (406, 506, 606) that bundling is enabled for the specific HARQ process based on the received indication; and transmitting/receiving (408, 508, 610) a transmission for the specific HARQ process with bundling enabled.

2. The method of embodiment 1 wherein the specific HARQ process is a HARQ process for which HARQ mechanisms are at least partially deactivated.

3. The method of embodiment 1 or 2 further comprising receiving (404), from the base station, an indication of a number of repetitions to use for bundling for the specific HARQ process.

4. The method of any one of embodiments 1 to 3 wherein non-contiguous bundling is allowed for the specific HARQ process.

5. The method of any one of embodiments 1 to 3 wherein the bundling for the specific HARQ process is non-contiguous bundling.

6. The method of embodiment 4 or 5 further comprising receiving (504), from the base station, an indication of a non-contiguous bundling pattern to be used for non-contiguous bundling for the specific HARQ process.

7. The method of any one of embodiments 1 to 6 wherein, for bundling for the specific HARQ process, a codeword for the transmission is generated, rate matched, and mapped to resource elements from available symbols assigned to each transport block used for the bundling.

8. The method of any one of embodiments 1 to 7 further comprising:

starting (608) a timer upon determining (606) that bundling is enabled for the specific HARQ process based on the received indication;

wherein transmitting/receiving (408, 508, 610) the transmission for the specific HARQ process with bundling enabled comprises transmitting/receiving (610) the transmission for the specific HARQ process with bundling enabled while the timer is running.

9. The method of embodiment 8 wherein the transmission is a downlink transmission, and transmitting/receiving (610) the transmission for the specific HARQ process with bundling enabled while the timer is running comprises:

receiving two or more bundled transport blocks for the specific process while the timer is running; and decoding a transport block for the downlink transmission using the two or more bundled transport blocks (e.g., after the timer has expired).

10. The method of any one of embodiments 1 to 9 wherein receiving the indication that bundling is enabled for the specific HARQ process comprises receiving the indication via dynamic signaling (e.g., in a DCI message scheduling the transmission, in a MAC CE, by using a specific RNTI) or semi-static signaling (e.g., RRC signaling).

11. The method of any one of embodiments 1 to 9 wherein receiving the indication that bundling is enabled for the specific HARQ process comprises receiving a DCI message scheduling the transmission, wherein the DCI message comprises a NDI field that is repurposed to provide the indication that bundling is enabled for the specific HARQ process.

12. The method of any one of embodiments 1 to 9 wherein receiving the indication that bundling is enabled for the specific HARQ process comprises receiving the indication via RRC signaling.

13. The method of any one of embodiments 1 to 9 wherein receiving the indication that bundling is enabled for the specific HARQ process comprises receiving indication via a combination of RRC signaling and dynamic signaling (e.g., MAC CE or DCI).

14. The method of any one of embodiments 1 to 9 wherein receiving the indication that bundling is enabled for the specific HARQ process comprises receiving the indication via a combination of RRC signaling and a specific RNTI.

15. The method of any one of embodiments 1 to 9 wherein receiving the indication that bundling is enabled for the specific HARQ process comprises receiving a DCI message comprising the indication.

16. The method of any one of embodiments 1 to 9 wherein receiving the indication that bundling is enabled for the specific HARQ process comprises receiving a message to increase bundling (e.g., increase aggregation factor) for the specific HARQ process.

17. The method of any one of embodiments 1 to 9 wherein receiving the indication that bundling is enabled for the specific HARQ process comprises receiving a message to decrease bundling (e.g., decrease aggregation factor) for the specific HARQ process.

18. The method of any one of embodiments 1 to 9 wherein receiving the indication that bundling is enabled for the specific HARQ process comprises receiving a message to maintain bundling (e.g., maintain aggregation factor) for the specific HARQ process.

19. The method of any one of embodiments 1 to 18 wherein the transmission is a downlink transmission, and the method further comprises attempting to decode the transmission before all transport blocks in a respective bundle have been received.

20. The method of embodiment 19 further comprising discarding all remaining transport blocks in the respective bundle if the attempt to decode the transmission is successful.

21. The method of embodiment 19 or 20 further comprising providing feedback to the base station comprising information related to decoding of the bundle.

22. The method of any one of the embodiments 1 to 21 wherein the base station is a base station of a satellite-based radio access network.

23. The method of any one of embodiments 1 to 22 wherein transmitting/receiving the transmission comprises transmitting/receiving the transmission via a satellite link.

24. The method of any of the previous embodiments, further comprising:

providing user data; and forwarding the user data to a host computer via the transmission to the base station.

Group B Embodiments

25. A method performed by a base station for enabling bundling for a specific HARQ process, the method comprising at least one of:

sending (402, 502, 602), to a wireless device, an indication that bundling of transport blocks is enabled for a specific HARQ process (or a specific subset of all configured HARQ processes); and transmitting/receiving (408, 508, 610), to/from the wireless device, a transmission for the specific HARQ process with bundling enabled.

26. The method of embodiment 25 wherein the specific HARQ process is a HARQ process for which HARQ mechanisms are at least partially deactivated.

27. The method of embodiment 25 or 26 further comprising sending (404), to the wireless device, an indication of a number of repetitions to use for bundling for the specific HARQ process.

28. The method of any one of embodiments 25 to 27 wherein non-contiguous bundling is allowed for the specific HARQ process.

29. The method of any one of embodiments 25 to 27 wherein the bundling for the specific HARQ process is non-contiguous bundling.

30. The method of embodiment 28 or 29 further comprising sending (504), to the wireless device, an indication of a non-contiguous bundling pattern to be used for non-contiguous bundling for the specific HARQ process.

31. The method of any one of embodiments 25 to 30 wherein, for bundling for the specific HARQ process, a codeword for the transmission is generated, rate matched, and mapped to resource elements from available symbols assigned to each transport block used for the bundling.

32. The method of any one of embodiments 25 to 31 further comprising providing, to the wireless device, a value for a timer related to bundling for the specific HARQ process.

33. The method of any one of embodiments 25 to 32 wherein sending the indication that bundling is enabled for the specific HARQ process comprises sending the indication via dynamic signaling (e.g., in a DCI message scheduling the transmission, in a MAC CE, by using a specific RNTI) or semi-static signaling (e.g., RRC signaling).

34. The method of any one of embodiments 25 to 32 wherein sending the indication that bundling is enabled for the specific HARQ process comprises sending a DCI message scheduling the transmission, wherein the DCI message comprises a NDI field that is repurposed to provide the indication that bundling is enabled for the specific HARQ process.

35. The method of any one of embodiments 25 to 32 wherein sending the indication that bundling is enabled for the specific HARQ process comprises sending the indication via RRC signaling.

36. The method of any one of embodiments 25 to 32 wherein sending the indication that bundling is enabled for the specific HARQ process comprises sending indication via a combination of RRC signaling and dynamic signaling (e.g., MAC CE or DCI).

37. The method of any one of embodiments 25 to 32 wherein sending the indication that bundling is enabled for the specific HARQ process comprises sending the indication via a combination of RRC signaling and a specific RNTI.

38. The method of any one of embodiments 25 to 32 wherein sending the indication that bundling is enabled for the specific HARQ process comprises sending a DCI message comprising the indication.

39. The method of any one of embodiments 25 to 32 wherein sending the indication that bundling is enabled for the specific HARQ process comprises sending a message to increase bundling (e.g., increase aggregation factor) for the specific HARQ process.

40. The method of any one of embodiments 25 to 32 wherein sending the indication that bundling is enabled for the specific HARQ process comprises sending a message to decrease bundling (e.g., decrease aggregation factor) for the specific HARQ process.

41. The method of any one of embodiments 25 to 32 wherein sending the indication that bundling is enabled for the specific HARQ process comprises sending a message to maintain bundling (e.g., maintain aggregation factor) for the specific HARQ process.

42. The method of embodiment 25 or 32 further comprising receiving, from the wireless device, feedback comprising information related to decoding of the bundle.

43. The method of any one of the embodiments 25 to 42 wherein the base station is a base station of a satellite-based radio access network.

44. The method of any one of embodiments 25 to 43 wherein transmitting/receiving the transmission comprises transmitting/receiving the transmission via a satellite link.

45. The method of any of the previous embodiments, further comprising:
obtaining user data; and
forwarding the user data to a host computer or a wireless device.

Group C Embodiments

46. A wireless device for deactivating HARQ mechanisms, the wireless device comprising:
processing circuitry configured to perform any of the steps of any of the Group A embodiments; and
power supply circuitry configured to supply power to the wireless device.

47. A base station for deactivating HARQ mechanisms, the base station comprising:
processing circuitry configured to perform any of the steps of any of the Group B embodiments; and
power supply circuitry configured to supply power to the base station.

48. A User Equipment, UE, for deactivating HARQ mechanisms, the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.

49. A communication system including a host computer comprising:
processing circuitry configured to provide user data; and
a communication interface configured to forward the user data to a cellular network for transmission to a User Equipment, UE;
wherein the cellular network comprises a base station having a radio interface and processing circuitry, the base station's processing circuitry configured to perform any of the steps of any of the Group B embodiments.

50. The communication system of the previous embodiment further including the base station.

51. The communication system of the previous 2 embodiments, further including the UE, wherein the UE is configured to communicate with the base station.

52. The communication system of the previous 3 embodiments, wherein:
   the processing circuitry of the host computer is configured to execute a host application, thereby providing the user data; and
   the UE comprises processing circuitry configured to execute a client application associated with the host application.

53. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the base station performs any of the steps of any of the Group B embodiments.

54. The method of the previous embodiment, further comprising, at the base station, transmitting the user data.

55. The method of the previous 2 embodiments, wherein the user data is provided at the host computer by executing a host application, the method further comprising, at the UE, executing a client application associated with the host application.

56. A User Equipment, UE, configured to communicate with a base station, the UE comprising a radio interface and processing circuitry configured to perform the method of the previous 3 embodiments.

57. A communication system including a host computer comprising:
   processing circuitry configured to provide user data; and
   a communication interface configured to forward user data to a cellular network for transmission to a User Equipment, UE;
   wherein the UE comprises a radio interface and processing circuitry, the UE's components configured to perform any of the steps of any of the Group A embodiments.

58. The communication system of the previous embodiment, wherein the cellular network further includes a base station configured to communicate with the UE.

59. The communication system of the previous 2 embodiments, wherein:
   the processing circuitry of the host computer is configured to execute a host application, thereby providing the user data; and
   the UE's processing circuitry is configured to execute a client application associated with the host application.

60. A method implemented in a communication system including a host computer, a base station, and a User Equipment, UE, the method comprising:
   at the host computer, providing user data; and
   at the host computer, initiating a transmission carrying the user data to the UE via a cellular network comprising the base station, wherein the UE performs any of the steps of any of the Group A embodiments.

61. The method of the previous embodiment, further comprising at the UE, receiving the user data from the base station.

62. A communication system including a host computer comprising:
   communication interface configured to receive user data originating from a transmission from a User Equipment, UE, to a base station;
   wherein the UE comprises a radio interface and processing circuitry, the UE's processing circuitry configured to perform any of the steps of any of the Group A embodiments.

63. The communication system of the previous embodiment, further including the UE.

64. The communication system of the previous 2 embodiments, further including the base station, wherein the base station comprises a radio interface configured to communicate with the UE and a communication interface configured to forward to the host computer the user data carried by a transmission from the UE to the base station.

65. The communication system of the previous 3 embodiments, wherein:
   the processing circuitry of the host computer is configured to execute a host application; and
   the UE's processing circuitry is configured to execute a client application associated with the host application, thereby providing the user data.

66. The communication system of the previous 4 embodiments, wherein:
   the processing circuitry of the host computer is configured to execute a host application, thereby providing request data; and
   the UE's processing circuitry is configured to execute a client application associated with the host application, thereby providing the user data in response to the request data.

67. A method implemented in a communication system including a host computer, a base station, and a User Equipment, UE, the method comprising:
   at the host computer, receiving user data transmitted to the base station from the UE, wherein the UE performs any of the steps of any of the Group A embodiments.

68. The method of the previous embodiment, further comprising, at the UE, providing the user data to the base station.

69. The method of the previous 2 embodiments, further comprising:
   at the UE, executing a client application, thereby providing the user data to be transmitted; and
   at the host computer, executing a host application associated with the client application.

70. The method of the previous 3 embodiments, further comprising:
   at the UE, executing a client application; and
   at the UE, receiving input data to the client application, the input data being provided at the host computer by executing a host application associated with the client application;
   wherein the user data to be transmitted is provided by the client application in response to the input data.

71. A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

72. The communication system of the previous embodiment further including the base station.

73. The communication system of the previous 2 embodiments, further including the UE, wherein the UE is configured to communicate with the base station.

74. The communication system of the previous 3 embodiments, wherein:
   the processing circuitry of the host computer is configured to execute a host application; and
   the UE is configured to execute a client application associated with the host application, thereby providing the user data to be received by the host computer.

75. A method implemented in a communication system including a host computer, a base station, and a User Equipment, UE, the method comprising:
at the host computer, receiving, from the base station, user data originating from a transmission which the base station has received from the UE, wherein the UE performs any of the steps of any of the Group A embodiments.

76. The method of the previous embodiment, further comprising at the base station, receiving the user data from the UE.

77. The method of the previous 2 embodiments, further comprising at the base station, initiating a transmission of the received user data to the host computer.

Abbreviations

At least some of the following abbreviations may be used in this disclosure. If there is an inconsistency between abbreviations, preference should be given to how it is used above. If listed multiple times below, the first listing should be preferred over any subsequent listing(s).
3GPP 3rd Generation Partnership Project
BS Base Station
BL/CE Bandwidth Limited/Coverage Extended
CP Cyclic Prefix
DRX Discontinuous Reception
GEO Geostationary Orbit
GPS Global Positioning System
GW Gateway
LEO Low Earth Orbit
LTE Long Term Evolution
MAC Medium Access Control
MEO Medium Earth Orbit
Msg1 Message 1
Msg2 Message 2
Msg3 Message 3
Msg4 Message 4
NGSO Non-Geostationary Orbit
NR New Radio
RTT Round-Trip Time
RRC Radio Resource Control
SI System Information
SR Scheduling Requests
TA Timing Advance
UE User Equipment
SC_PTM Single-cell point-to-multipoint
SC_MTCH Single-cell multicast traffic channel
SC_MCCH Single-cell multicast control channel
HARQ Hybrid automatic repeat request Those skilled in the art will recognize improvements and modifications to the embodiments of the present disclosure. All such improvements and modifications are considered within the scope of the concepts disclosed herein.

What is claimed is:

1. A method performed by a wireless device for mapping data to specific HARQ processes, the method comprising:
receiving an indication that maps data that can be sent on one or more of specific HARQ processes; and
transmitting a transmission for a specific HARQ process of the one or more specific HARQ processes based on the received indication, such that;
when the indication comprises a parameter for logical channel prioritization (LCP), a restriction applies to logical channels such that only data from specific logical channels are included that are allowed to send data on HARQ processes with a HARQ procedure disabled, based on the received indication; and
when the indication does not comprise the parameter for logical channel prioritization, the wireless device interprets that logical channels are allowed to send data on the specific HARQ process without said restriction.

2. The method of claim 1 wherein the indication is provided by radio resource control (RRC) signaling.

3. A method performed by a base station, the method comprising:
determining an indication for mapping data; and
sending to a wireless device an indication that maps data that can be sent on one or more of specific HARQ processes, such that:
when the indication comprises a parameter for logical channel prioritization (LCP), a restriction applies to logical channels such that only data from specific logical channels are included that are allowed to send data on HARQ processes with a HARQ procedure disabled, based on the received indication; and
when the indication does not comprise the parameter for logical channel prioritization, the wireless device is enabled to interpret that logical channels are allowed to send data on the specific HARQ process without said restriction.

4. The method of claim 1, wherein the indication is provided by radio resource control (RRC) signaling.

5. A wireless device for mapping data to specific HARQ processes, the wireless device comprising processing circuitry configured to:
receive an indication that maps data that can be sent on one or more of specific HARQ processes; and
transmit a transmission for a specific HARQ process of the one or more specific HARQ processes based on the received indication, such that;
when the indication comprises a parameter for logical channel prioritization (LCP), a restriction applies to logical channels such that only data from specific logical channels are included that are allowed to send data on HARQ processes with a HARQ procedure disabled, based on the received indication; and
when the indication does not comprise the parameter for logical channel prioritization, the wireless device interprets that logical channels are allowed to send data on the specific HARQ process without said restriction.

6. The wireless device of claim 5 wherein the indication is provided by radio resource control (RRC) signaling.

7. The method of claim 1, wherein the method is for communication with a non-terrestrial network.

8. The method of claim 1, wherein the method is for communication with a non-terrestrial network supported in new radio (NR).

9. The wireless device of claim 5, wherein the wireless device is for communication with a non-terrestrial network.

10. The wireless device of claim 5, wherein the wireless device is for communication with a non-terrestrial network supported in new radio (NR).

11. A base station comprising processing circuitry configured to:
determine an indication for mapping data; and
send to a wireless device an indication that maps data that can be sent on one or more of specific HARQ processes such that:
when the indication comprises a parameter for logical channel prioritization, a restriction applies to logical channels such that only data from specific logical channels are included that are allowed to send data on HARQ processes with a HARQ procedure disabled, based on the received indication; and when the indication does not comprise the parameter for logical channel prioritization, the wireless device is enabled to interpret that logical channels are allowed to send data on the specific HARQ process without said restriction.

12. The base station of claim 11, wherein the base station is for use in a non-terrestrial network.

13. The base station of claim 11, wherein the base station is for use in a non-terrestrial network supported in New Radio (NR).

14. The base station of claim 11, wherein the indication is provided by Radio Resource Control (RRC) signaling.

* * * * *